United States Patent
Ito et al.

(10) Patent No.: US 7,573,544 B2
(45) Date of Patent: Aug. 11, 2009

(54) POLARIZING PLATE COMPRISING LIGHT-SCATTERING POLARIZING ELEMENT AND LIGHT-ABSORBING POLARIZING ELEMENT

(75) Inventors: Yoji Ito, Kanagawa (JP); Eiichiro Aminaka, Kanagawa (JP); Ichiro Amimori, Kanagawa (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 353 days.

(21) Appl. No.: 11/400,522

(22) Filed: Apr. 10, 2006

(65) Prior Publication Data
US 2006/0176425 A1    Aug. 10, 2006

Related U.S. Application Data

(62) Division of application No. 10/182,133, filed as application No. PCT/JP01/00563 on Jan. 29, 2001, now abandoned.

(30) Foreign Application Priority Data

| Jan. 27, 2000 | (JP) | ................ 2000-18763 |
| Feb. 29, 2000 | (JP) | ................ 2000-53991 |
| Mar. 30, 2000 | (JP) | ................ 2000-95399 |
| Apr. 18, 2000 | (JP) | ................ 2000-116529 |
| Sep. 26, 2000 | (JP) | ................ 2000-292760 |

(51) Int. Cl.
*G02F 1/1335* (2006.01)

(52) U.S. Cl. .................................................. 349/96
(58) Field of Classification Search ............ 349/96–98; 428/1.1, 1.31
See application file for complete search history.

(56) References Cited

U.S. PATENT DOCUMENTS

| 5,751,388 A | 5/1998 | Larson |
| 7,128,953 B2 * | 10/2006 | Ohkawa et al. ............ 428/1.31 |
| 2002/0130995 A1 | 9/2002 | Nakanishi et al. |
| 2003/0011725 A1 | 1/2003 | Ohkawa et al. |

FOREIGN PATENT DOCUMENTS

| EP | 0 506 176 A1 | 9/1992 |
| JP | 05-045519 A | 2/1993 |
| JP | 09-159819 A | 6/1997 |
| JP | 09-274108 A | 10/1997 |
| JP | 11-174211 A | 7/1999 |
| JP | 11-326610 A | 11/1999 |

* cited by examiner

*Primary Examiner*—Dung T. Nguyen
(74) *Attorney, Agent, or Firm*—Buchanan Ingersoll & Rooney PC

(57) ABSTRACT

A polarizing plate comprises a light-scattering polarizing element and a light-absorbing polarizing element. The elements are so arranged that the polarizing transmission axis of the light-scattering polarizing element is essentially parallel to the polarizing transmission axis of the light-absorbing polarizing element. The light-scattering polarizing element has a polarizing layer comprising an optically isotropic continuous phase and an optically anisotropic discontinuous phase.

25 Claims, 4 Drawing Sheets

PRIOR ART

POLARIZING PLATE COMPRISING LIGHT-SCATTERING POLARIZING ELEMENT AND LIGHT-ABSORBING POLARIZING ELEMENT

CROSS REFERENCE TO RELATED APPLICATIONS

This application is a divisional of U.S. application Ser. No. 10/182,133, filed Oct. 21, 2002, now abandoned which was the National Stage of International Application No. PCT/JP01/00563, filed Jan. 29, 2001. The contents of U.S. application Ser. No. 10/182,133, filed Oct. 21, 2002, are herein incorporated by reference.

FILED OF THE INVENTION

The present invention relates to a polarizing plate comprising a light-scattering polarizing element, which selectively transmits polarized light and selectively reflects or scatters other polarized light, and a light-absorbing polarizing element, which selectively transmits polarized light and selectively absorbs other polarized light.

The invention also relates to an image display element having the polarizing plate, which improves efficiency of light.

The invention further relates to an optical film, which is advantageously used as a light-scattering polarizing element.

BACKGROUND OF THE INVENTION

Light emitted from natural light sources such as the sun is generally non-polarized (randomly polarized). Light emitted from artificial light sources such as a lamp is also generally non-polarized. A polarizing plate can extract polarized light (linearly, circularly or elliptically polarized light) from non-polarized light. The extracted polarized light can be used in various optical devices. For example, a liquid crystal display widely used nowadays is an instrument that utilizes characters of polarized light to display an image.

The polarizing plates in a broad sense include linearly, circularly and elliptically polarizing plates. However, the term of the polarizing plate usually (in a narrow sense) means only a linearly polarizing plate. In the present specification, the polarizing plate means a linearly polarizing plate, which is the basic polarizing plate.

A linearly polarizing plate generally used is a light-absorbing polarizing element consisting of a polyvinyl alcohol film. A polyvinyl alcohol film is stretched, and the film adsorbs iodine or a dichromatic dye to prepare a polarizing element. The stretched polarizing element has a transmission axis (polarizing axis) perpendicular to the stretching direction.

The light-absorbing polarizing element transmits only a light component polarized parallel to the polarizing axis, and absorbs a perpendicularly polarized component. There-fore, usable light through the element is theoretically 50% or less (practically, much less than 50%) of the original light.

A light-scattering polarizing element has been proposed in place of the light-absorbing polarizing element to increase the amount of usable light (efficiency of light). The light-scattering polarizing element also transmits only the light component polarized parallel to the polarizing axis, but scatters forward or backward the perpendicularly polarized component. The light-scattering polarizing element can improve the efficiency of light by using the scattered light.

The light-scattering polarizing element is described in Japanese Patent Provisional Publication Nos. 8(1996)-76114, 9(1997)-274108, 9(1997)-297204, Japanese Patent Publication Nos. 11(1999)-502036, 11(1999)-509014, and U.S. Pat. Nos. 5,783,120, 5,825,543 and 5,867,316.

SUMMARY OF THE INVENTION

An object of the present invention is to provide a polarizing plate improving efficiency of light.

Another object of the invention is to provide a liquid crystal display giving clear images.

A further object of the invention is to provide an optical film having scattering characters easily controllable, even and large in a large area.

The present invention provides a polarizing plate comprises a light-scattering polarizing element having a polarizing layer which selectively transmits polarized light and selectively reflects or scatters other polarized light, and a light-absorbing polarizing element having a polarizing layer which selectively transmits polarized light and selectively absorbs polarized light, said elements being so arranged that the polarizing transmission axis of the light-scattering polarizing element is essentially parallel to the polarizing transmission axis of the light-absorbing polarizing element, and said polarizing layer in the light-scattering polarizing element comprising an optically isotropic continuous phase and an optically anisotropic discontinuous phase.

The invention also provides a liquid crystal display comprising a backlight, a polarizing plate, a liquid crystal cell of twist nematic mode and another polarizing plate in this order, wherein the polarizing plate on the backlight comprises a light-scattering polarizing element having a polarizing layer which selectively transmits polarized light and selectively reflects or scatters other polarized light, and a light-absorbing polarizing element having a polarizing layer which selectively transmits polarized light and selectively absorbs polarized light, said elements being so arranged that the polarizing transmission axis of the light-scattering polarizing element is essentially parallel to the polarizing transmission axis of the light-absorbing polarizing element, and said polarizing layer in the light-scattering polarizing element comprising an optically isotropic continuous phase and an optically anisotropic discontinuous phase.

The invention further provides a liquid crystal display comprising a backlight, a polarizing plate, a liquid crystal cell of bend alignment mode and another polarizing plate in this order, wherein the polarizing plate on the backlight comprises a light-scattering polarizing element having a polarizing layer which selectively transmits polarized light and selectively reflects or scatters other polarized light, and a light-absorbing polarizing element having a polarizing layer which selectively transmits polarized light and selectively absorbs polarized light, said elements being so arranged that the polarizing transmission axis of the light-scattering polarizing element is essentially parallel to the polarizing transmission axis of the light-absorbing polarizing element, and said polarizing layer in the light-scattering polarizing element comprising an optically isotropic continuous phase and an optically anisotropic discontinuous phase.

The invention furthermore provides a liquid crystal display comprising a backlight, a polarizing plate, a liquid crystal cell of horizontal aligning mode and another polarizing plate in this order, wherein the polarizing plate on the backlight comprises a light-scattering polarizing element having a polarizing layer which selectively transmits polarized light and selectively reflects or scatters other polarized light, and a light-absorbing polarizing element having a polarizing layer which selectively transmits polarized light and selectively absorbs polarized light, said elements being so arranged that the polarizing transmission axis of the light-scattering polarizing element is essentially parallel to the polarizing transmission axis of the light-absorbing polarizing element, and said polarizing layer in the light-scattering polarizing element comprising an optically isotropic continuous phase and an optically anisotropic discontinuous phase.

The invention still furthermore provides an optical film comprising a transparent support and a polarizing layer which selectively transmits polarized light and selectively reflects or scatters other polarized light, said polarizing layer comprising an optically isotropic continuous phase and an optically anisotropic discontinuous phase, wherein the maximum transmittances for all rays is not less than 75% and the minimum transmittances for all rays is less than 60% where the transmittances are measured along polarizing planes perpendicular to plane of the polarizing layer.

In the present specification, the term "essentially perpendicular", "essentially parallel" or "essentially at the angle of 45°" means that the difference between the theoretical angel (90°, 0° or 45°) and the measured angle is less than ±5°. This difference is preferably less than ±4°, more preferably less than ±3°, and most preferably less than ±2°.

The terms "slow axis" mean the direction giving the maximum refractive index, and the term "transmission axis" and the minimum refractive index, respectively.

Figure 1:
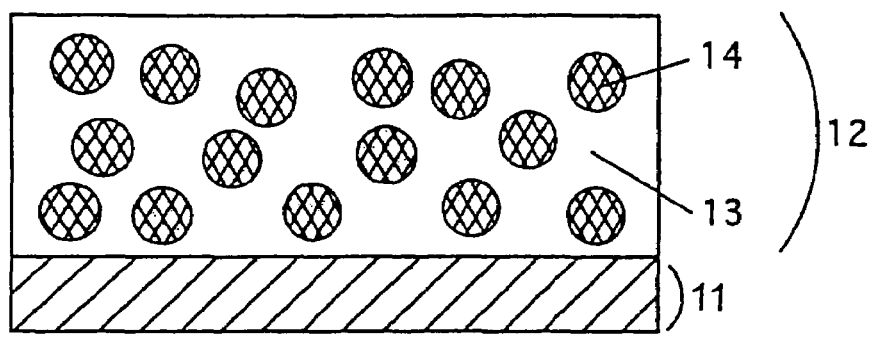
FIG. 1 is a sectional view schematically illustrating a basic structure of an optical film.

DETAILED DESCRIPTION OF THE INVENTION (Improvement of Light Efficiency by Use of Light-Scattering Polarizing Element)

The following mechanisms (A) to (C) using light-scattering polarizing elements have been proposed to improve efficiency of light. The mechanisms (A) to (C) can be applied to the present invention.

(A) Depolarization of Front Scattered Light

The light-scattering polarizing element scatters forward or backward light polarized perpendicularly to the polarizing axis. The light scattered forward (front scattered light) is depolarized to rotate the polarizing direction. The rotated direction is different from the polarizing direction of the incident light and hence the scattered light has a light component polarized parallel to the polarizing axis of the element. Consequently, the component polarized in the polarizing direction of the element is increased. If the polarizing element contains many particles in the thickness direction, multiple scattering occurs to enhance the depolarization. In this way, the efficiency of light is improved by the depolarization of front scattered light if the light-scattering polarizing element is used, as compared with the efficiency when the light-absorbing polarizing element is used alone.

(B) Reuse (Depolarization) of Back Scattered Light

The component scattered backward (back scattered light) is depolarized when it is scattered. The back scattered light is reflected by a metal reflector placed behind the backlight (light source), and again enters the light-scattering polarizing element. Since the depolarized light (back scattered light) has the light component polarized parallel to the polarizing axis of the element, a part of the reentering light passes through the element. The scattering on the polarizing element and the reflection on the reflector are repeated in this way to improve the efficiency of light.

(C) Reuse (Rotation of Polarizing Direction) of Back Scattered Light

In an optical system comprising a λ/4 plate and a metal reflector, incident light linearly polarized at 45° to the slow axis of the λ/4 plate is reflected to rotate its polarizing direction by 90°. For applying this effect, a λ/4 plate is provided between the light-scattering polarizing element and the metal reflector (placed behind the backlight) so that the slow axis of the λ/4 plate may be placed at 45° to the polarizing axis of the polarizing element.

The light scattered backward has a component polarized perpendicularly to the polarizing axis of the polarizing element in a large amount. Accordingly, the light scattered backward, passed through the λ/4 plate, reflected by the metal reflector and then reentering the polarizing element has a light component polarized parallel to the polarizing axis of the polarizing element in a large amount. Since the light component parallel polarized can pass through the polarizing element, the efficiency of light is thus improved by the λ/4 plate provided between the light-scattering polarizing element and the metal reflector.

(Structure of Optical Film and Liquid Crystal Display)

FIG. 1 is a sectional view schematically illustrating a basic structure of an optical film.

The optical film shown in FIG. 1 comprises a transparent support (11) and a polarizing layer (12) provided thereon. The polarizing layer (12) consists of an optically isotropic continuous phase (13) and an optically anisotropic discontinuous phase (14). The discontinuous phase (14) comprises an optically anisotropic compound showing birefringence, whose two birefringent indexes (n1, n2) in the discontinuous phase depend on characters and aligning degree of the optically anisotropic compound.

The optical film of FIG. 1 can serve as a light-scattering polarizing element, where either n1 or n2 is essentially the same as the refractive index of the continuous phase (i.e., less than 0.05). The direction giving essentially the same refractive index (n1 or n2) corresponds to the transmission axis of the polarizing layer.

Figure 2:
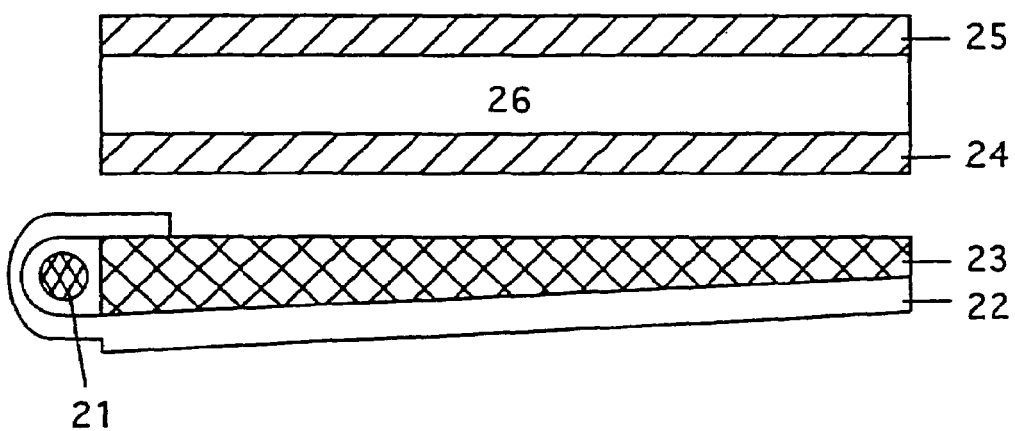
FIG. 2 is a sectional view schematically illustrating a conventional liquid crystal display comprising only a light-absorbing polarizing element.

FIG. 2 is a sectional view schematically illustrating a conventional liquid crystal display comprising only a light-absorbing polarizing element.

The liquid crystal display shown in FIG. 2 comprises a backlight (21) of edge light type as a light source placed on the bottom. From the bottom side, a reflecting plate (22) and a light-leading plate (23) are overlaid. These plates make light of the backlight come out to the surface. The backlight may be placed at the bottom (direct type), and in that case the light-leading plate is unnecessary.

A liquid crystal cell (26) sandwiched between a pair of polarizing elements of light-absorbing type (24, 25) is placed above the light source (21) to display images. The lower light-absorbing polarizing element (24) absorbs at least 50% of light emitted from the light source (21).

Figure 3:
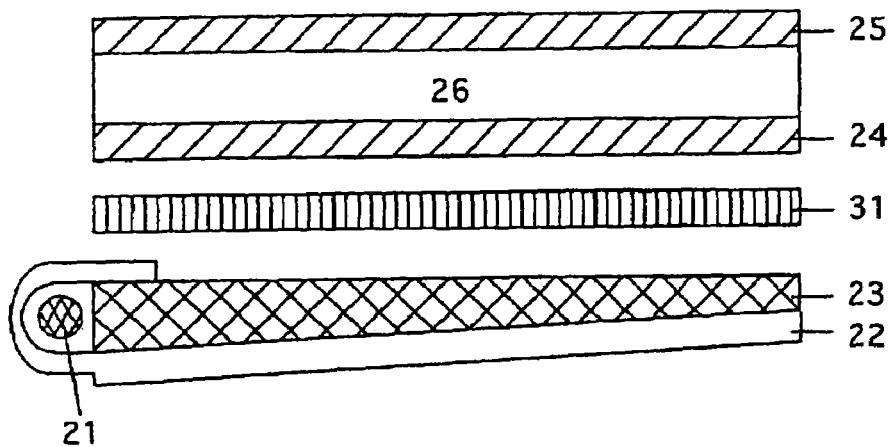
FIG. 3 is a sectional view schematically illustrating a liquid crystal display comprising a light-absorbing polarizing element and a light-scattering polarizing element, wherein the elements are not laminated.

FIG. 3 is a sectional view schematically illustrating a liquid crystal display comprising a light-absorbing polarizing element and a light-scattering polarizing element.

The liquid crystal display shown in FIG. 3 is that of FIG. 2 supplemented with a light-scattering polarizing element (31). The light-scattering polarizing element (31) selectively transits the light component polarized parallel to the transmission axis of the lower light-absorbing polarizing element (24). At the same time, the light component polarized perpendicularly to the transmission axis is partially scattered forward by the element (31), and depolarized to rotate the polarizing plane to be parallel to the transmission axis. Consequently, the efficiency of light is improved. On the other hand, the light component polarized perpendicularly to the transmission axis is partially scattered backward to the light source (21) side, depolarized by the light-leading plate (23) and reflected by the reflecting plate (22). The reflected light component comes back to the element (31) to reuse, to further improve the efficiency of light.

In the liquid crystal display of FIG. 3, the light-absorbing polarizing element (24) and that of light-scattering type (31) are not laminated. If they are laminated, the efficiency of light is furthermore improved.

Figure 4:
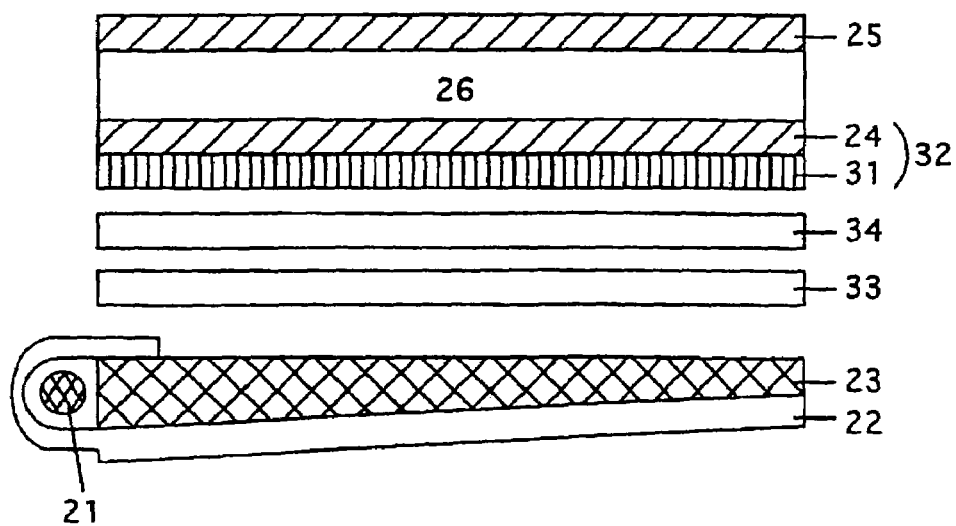
FIG. 4 is a sectional view schematically illustrating a liquid crystal display having a polarizing plate comprising a light-absorbing polarizing element and a light-scattering polarizing element.

FIG. 4 is a sectional view schematically illustrating a liquid crystal display equipped with a polarizing plate comprising laminated polarizing elements of light-absorbing type and light-scattering type.

In FIG. 4, light emitted from the light source (21) is reflected by the reflecting plate (22), and passes through the light-leading plate (23). The light is then made to have even brightness in the plane by a scattering sheet (33). The display of FIG. 4 comprises a film (34) condensing light to a predetermined direction, and thereby light extremely obliquely coming (users do not see such light) is condensed to the front so as to improve the efficiency of light. In this display, though the amount of light slightly obliquely coming (users may see such light) is reduced, the light is adequately defused by a polarizing plate (32) comprising laminated polarizing elements of light-absorbing type (24) and light-scattering type (31). Further, the polarizing plate (32) comprising laminated polarizing elements of light-absorbing type (24) and light-scattering type (31) improves the brightness of the liquid crystal display on the same principle as described above in FIG. 3. Consequently, natural viewing angel distribution can be realized.

In the liquid crystal display of FIG. 3, the amount of usable light is reduced by 10% because of reflection on the surface of the light-scattering polarizing element (31) (in the side opposite to the polarizing layer) and that on the light-absorbing polarizing element (24). In contrast, in the liquid crystal display of FIG. 4, those reflection surfaces are omitted because the polarizing plate (32) comprising laminated polarizing elements of light-absorbing type (24) and light-scattering type (31) is use, and hence the efficiency of light is improved at least by 10%.

Figure 5:
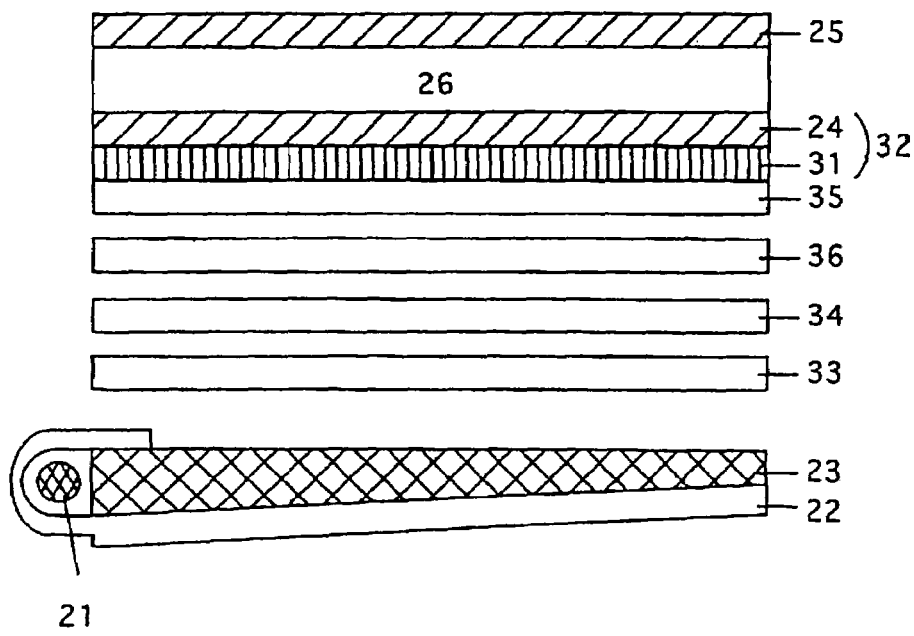
FIG. 5 is a sectional view schematically illustrating another liquid crystal display having a polarizing plate comprising a light-absorbing polarizing element and a light-scattering polarizing element.
Figure 6:
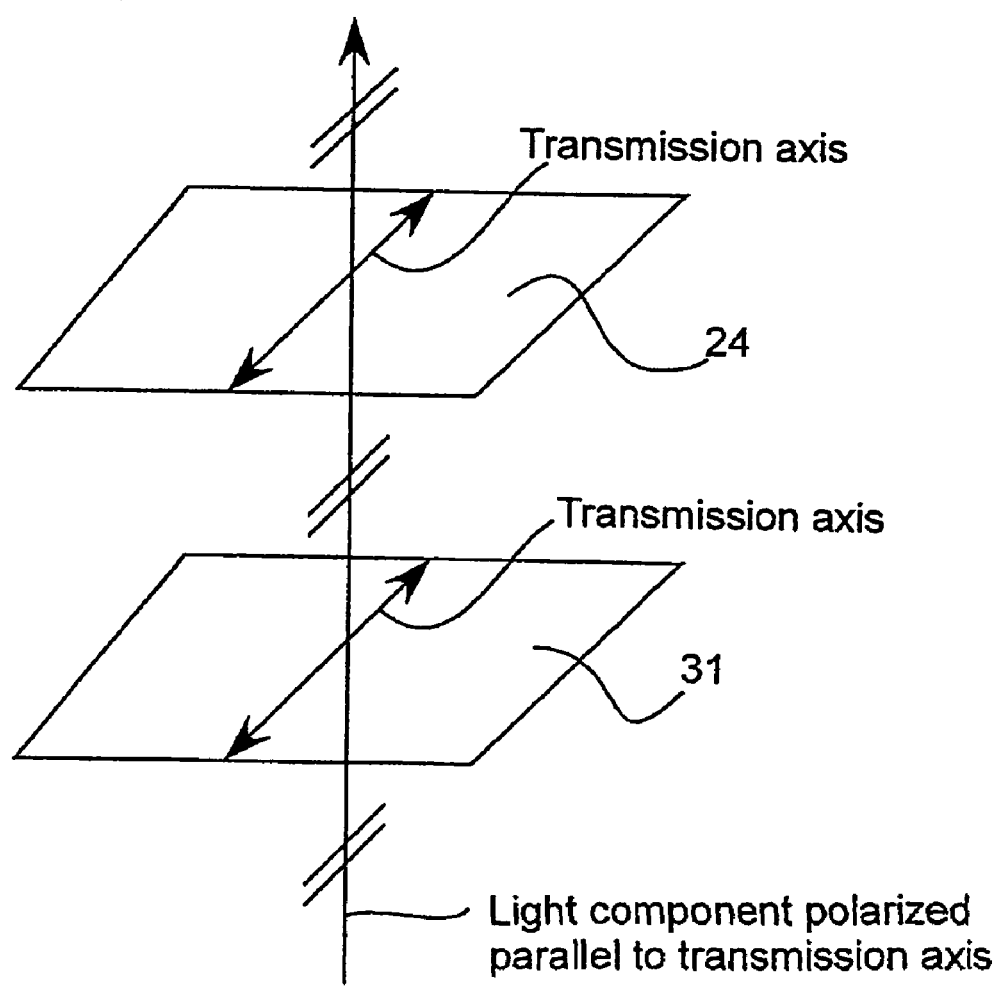
FIG. 6 is a perspective view schematically illustrating an exemplary orientation of a light-scattering polarizing element and a light-absorbing polarizing element.

FIG. 5 is a sectional view schematically illustrating another liquid crystal display equipped with a polarizing plate comprising laminated polarizing elements of light-absorbing type and light-scattering type.

In the display of FIG. 5, the polarizing plate (32) comprising laminated polarizing elements of light-absorbing type (24) and light-scattering type (31) is further improved in brightness. On the polarizing layer of the light-scattering polarizing element (31), an antireflection layer (35) is provided directly or via another layer so as to reduce reflection on the surface and to increase the amount of light coming into the polarizing layer. Further, a λ/4 plate (36) is provided below the polarizing plate (32). Because of rotation of polarizing direction of light scattered backward (back scattered light) described above in (C), back scattered light polarized perpendicularly to the transmission axis of the light-absorbing polarizing element (31) passes through the λ/4 plate (36) twice so that the polarizing axis may rotate to be parallel to the transmission axis of the element of light-absorbing type (31), so as to remarkably improve the efficiency of light. The other components such as the light source (21), the reflecting plate (22), the light-leading plate (23), the scattering sheet (33) and the light-condensing film (34) can function in the same manner as in the liquid crystal display of FIG. 4.

(Transparent Support)

The polarizing plate preferably has at least one transparent support. The polarizing elements of light-absorbing type and light-scattering type may share one transparent support, or otherwise each element may have a transparent support. Further, two transparent supports may be provided to protect both surfaces of the polarizing layer in the light-absorbing polarizing element or light-scattering type.

The term "transparent" in the transparent support means that the support has a light transmittance of 80% or more. Further, the support preferably shows optical isotropy when seen from the front. It is, therefore, preferred that the support be made of materials showing small birefringence. However, the optically isotropic transparent support can be made of materials even showing large birefringence (e.g., polycarbonate, polyester, polyarylate, polysulfone, polyethersulfone) if conditions of film forming (solvent cast, melt extruding) or of stretching laterally or longitudinally are adequately selected.

As the transparent support, a glass plate or a polymer film can be used. Examples of material for the polymer film include polyolefin (e.g., polyethylene), norbornene resin, polyethylene terephthalate, polyethylene naphthalate, polypropylene, polycarbonate, polystyrene (e.g., syndiotactic polystyrene), polyarylate, polysulfone, polyethersulfone, polyvinyl chloride, polyvinyl alcohol and cellulose ester (e.g., cellulose acetate). The film may be made of a mixture of two or more polymers. Commercially available polymers (e.g., Zeonex, Zeonoa [Nippon Zeon Co., Ltd.]; ARTON [JSR Co., Ltd.]; Fujitac [Fiji Photo film Co., Ltd.]; triacetyl cellulose) are also usable.

The transparent support preferably protects the polarizing layer (particularly, the polarizing layer of the light-absorbing polarizing element). In consideration of protecting, a film of cellulose acetate is preferred. The acetic acid content of cellulose acetate is preferably in the range of 55 to 61.5% cellulose diacetate or cellulose triacetate), more preferably in the range of 59 to 61% (cellulose triacetate).

In the case where a cellulose triacetate film is used as the transparent support, the film is preferably produced essentially without the solvent of halogenated hydrocarbon. When a conventional cellulose triacetate film is produced, a halogenated hydrocarbon (particularly, methylene chloride) is generally used as a solvent. However, in consideration of environmental problems, use of halogenated hydrocarbon has been gradually restricted. On the other hand, it has been difficult for organic solvents other than halogenated hydrocarbon to dissolve cellulose triacetate. Japanese Patent Provisional publication Nos. 9(1997)-95538, 9(1997)-95544 and 9(1997)-95557 disclose a method in which cellulose triacetate is cooled to dissolve in a normal organic solvent (ester, ether, ketone or alcohol having 3 to 12 carbon atoms). This method makes it possible to produce a cellulose triacetate film essentially without the solvent of halogenated hydrocarbon. The term "essentially without the solvent of halogenated hydrocarbon" mean that the solvent used in producing the film contains halogenated hydrocarbon in an amount of 5 wt. % or less (preferably, 1 wt. % or less). It is preferred that no halogenated hydrocarbon be found in the resultant cellulose triacetate film.

The thickness of the transparent support is preferably in the range of 10 to 500 μm, more preferably in the range of 40 to 200 μm.

The support may be subjected to a surface treatment (e.g., chemical treatment, mechanical treatment, corona discharge treatment, glow discharge treatment). Saponification treatment is a typical chemical treatment.

An undercoating layer may be provided on the support to enhance adhesion between the support and a neighboring layer such as the polarizing layer. If the transparent support is a cellulose triacetate film, the undercoating layer can be made of gelatin, poly(meth)acrylate, poly(meth)acrylamide, polystyrene, polybutadiene or a copolymer thereof.

(Optically Isotropic Continuous Phase)

The light-scattering polarizing element comprises a polarizing layer which selectively transmits particular polarized light and which selectively reflects or scatters other polarized light. The "particular polarized light" and the "other polarized light" generally have polarizing planes crossing perpendicularly to each other. The polarizing layer in the light-scattering polarizing element consists of an optically isotropic continuous phase and an optically anisotropic discontinuous phase.

The amount of the optically isotropic continuous phase is preferably in the range of 5 to 95 wt. %, more preferably in the range of 20 to 90 wt. %, most preferably in the range of 50 to 80 wt. % based on the weight of the polarizing layer.

The term "optically isotropic" means having an optical anisotropy of less than 0.05. (With respect to the optical anisotropy, the definition is below given in the description of optically anisotropic discontinuous phase.)

The optically isotropic continuous phase may be in the form of polymer matrix. The polymer constituting the continuous phase may have been a polymer in preparing the polarizing layer (for example, in a coating solution for preparing the layer), or otherwise may have been monomers at that stage, followed by polymerizing the monomers.

As the polymer, a polymer having high optical isotropy is used. However, even a polymer giving relatively high birefringence (e.g., polycarbonate, polystyrene) can be used if additives are incorporated to make the polymer optically isotropic.

The efficiency of backlight is more improved where the incident light coming into the light-scattering polarizing element is less reflected. Hence, the polymer matrix constituting the continuous phase has an average refractive index (n) of preferably not more than 1.70, more preferably not more than 1.6, most preferably not more than 1.55. The average refractive index (n) is represented by the formula: $n=(n_x+n_y+n_z)/3$.

In the formula, $n_x$ is a refractive index along the slow axis in plane; $n_y$ is a refractive index along the axis of light progression in plane; and $n_z$ is a refractive index in the thickness direction.

Examples of the polymer used for the optically isotropic continuous phase include proteins (e.g., gelatin, casein), polysaccharides (e.g., agarose, cellulose, pullulan, carrageenan, polygalacturonic acid, alginic acid), cellulose ethers, cellulose esters (e.g., cellulose acetate, cellulose diacetate, cellulose triacetate, cellulose propionate, cellulose butylate, cellulose acetatepropionate, cellulose nitrate), polyolefins (e.g., polyethylene, polypropylene, polymethyl pentene), polyolefin derivatives (e.g., polyvinyl chloride, polyvinyl alcohol, denatured polyvinyl alcohol, norbornene resin), polystyrene (e.g., syndiotactic polystyrene), polyesters (e.g., polyethylene terephthalate, polyethylene naphthalate, polycarbonate, poly-1,4-cyclohexanedimethyleneterephthalate, polyethylene-1,2-diphenoxyethane-4,4'-dicarboxylate, polybutylene terephthalate), polyamide, polysulfone, polyethersulfone, polyarylate, polyether imide, polyether ketone, polyacrylic esters and polymethacrylic esters (e.g., methyl methacrylate).

A mixture of two or more polymers can be used. Commercially available polymers (e.g., Zeonex, Zeonoa [Nippon Zeon Co., Ltd.]; ARTON [JSR Co., Ltd.]; Fujitac [Fiji Photo film Co., Ltd.]; triacetyl cellulose) are also usable.

A monomer forming the polymer for the optically isotropic continuous phase is preferably polymerized by heat or ionization radiation. Examples of polymerizable groups of the monomers include an ethylenically unsaturated polymerizable group, isocyanate group, epoxy group, aziridine group, oxazolidine group, aldehyde group, carbonyl group, hydrazine group, carboxyl group, methylol group, active methylene group, vinylsulfonic acid, acid anhydride bonding (—CO—O—CO—), cyanoacrylate group, melamine, etherized methylol, ester bonding, urethane bonding, and methal alkoxide (tetramethoxysilane) structure. An ethylenically unsaturated polymerizable group is preferred. It is particularly preferred that a monomer having two or more ethylenically unsaturated polymerizable groups be polymerized to form a polymer having crosslinked structure.

Examples of the monomer having two or more ethylenically unsaturated polymerizable groups include esters of polyhydric alcohol and (meth)acrylic acid (e.g., ethylene glycol di(meth)acrylate, 1,4-dichlorohexane acrylate, pentaerythritol tetra(meth)acrylate, pentaerythritol tri(meth)acrylate, trimethylolpropane tri(meth)acrylate, trimethylolethane tri(meth)acrylate, dipentaerythritol tetra (meth)acrylate, dipentaerythritol penta(meth)acrylate, pentaerythritol hexa(meth)acrylate, 1,3,5-cyclohexanetriol triacrylate, polyurethane polyacrylate, polyester polyacrylate), vinylbenzene and derivatives thereof (e.g., 1,4-divinylbenzene, 4-vinylbenzoic acid-2-acryloyl ethylester, 1,4-divinylcyclohexanone), vinylsulfones (e.g., divinylsulfone), acrylamides (e.g., methylene bisacrylamide) and methacrylamide.

In the case where the discontinuous phase is made to be optically anisotropic by stretching (aligning the liquid crystal compound), the optically isotropic continuous phase preferably contains a compound (plasticizer) to lower the glass transition temperature of the polymer of the continuous phase. Examples of the plasticizer include carboxylic esters (e.g., dibutyl phthalate), phosphoric esters (e.g., triphenyl phosphate) and polyhydric alcohols (e.g., glycerol). If an water-soluble polymer is used in the continuous phase, glycerol is particularly preferably incorporated.

(Optically Anisotropic Discontinuous Phase)

The amount of the optically anisotropic discontinuous phase is preferably not less than 3 wt. %, more preferably not less than 4 wt. %, further preferably not less than 5 wt. %, furthermore preferably not less than 10 wt. %, most preferably not less than 20 wt. % based on the weight of the polarizing layer. Also, the amount of the optically anisotropic discontinuous phase is preferably not more than 95 wt. %, more preferably not more than 80 wt. %, further preferably not more than 60 wt. %, furthermore preferably not more than 50 wt. %, most preferably not more than 40 wt. % based on the weight of the polarizing layer.

The term "optically anisotropic" means having an optical anisotropy of not less than 0.05. The optical anisotropy corresponds to birefringence |n1−n2|, which is the absolute value of difference between the refractive index (n1) along an axis included in the polarizing plane giving the maximum transmittance for all rays coming to the polarizing layer and the refractive index (n2) along an axis included in the polarizing plane giving the minimum transmittance for all rays. The optical anisotropy is preferably in the range of 0.05 to 1.00, more preferably in the range of 0.10 to 1.00, most preferably in the range of 0.15 to 1.00.

In order that the optical film can work as the light-scattering polarizing element, one of the refractive indexes (n1, n2) of the optically anisotropic discontinuous phase must be essentially the same as the refractive index of the optically isotropic continuous phase. The term "essentially the same" means that the difference between them is less than 0.05. The difference is preferably less than 0.01, more preferably less than 0.001. The direction in which the refractive index of the discontinuous phase and that of the continuous phase are the same corresponds to the transmission axis of the polarizing layer.

The optically anisotropic discontinuous phase is in the form of particles or drops dispersed in the optically isotropic continuous phase. The mean size of the particles or drops (mean radius of approximated circles having the same areas as the projected areas of the particles or drops) is preferably in the range of 0.01 to 10 μm, more preferably in the range of 0.05 to 5 μm, most preferably in the range of 0.05 to 1 μm.

There is no particular restriction on the shapes of the particles or drops. They may have spherical shape (having an average aspect ratio of not more than 2) or irregular shape (having a large surface area).

The optically anisotropic discontinuous phase is made of optically anisotropic material. After the polarizing layer is formed, the material is preferably exposed to light or stretched in a certain direction so that the material may have optical anisotropy (may be aligned).

As the optically anisotropic material, a photo-orienting compound (photo-reactive compound or photo-isomerizing compound), a liquid crystal compound or a mixture thereof is preferably used. The photo-orienting compound and the mixture of photo-orienting compound and liquid crystal compound can be made optically anisotropic by irradiation of light in a certain direction. If the liquid crystal compound itself naturally aligns along the direction in which light comes (namely, if the liquid crystal compound has a photo-reactive or photo-isomerizing group described after), even the liquid crystal compound alone can be made optical anisotropic by irradiation of light in a certain direction.

The photo-orienting compound (photo-reactive compound or photo-isomerizing compound) is preferably a polymer, namely a photo-reactive or photo-isomerizing polymer. The photo-reactive polymer is further categorized into a photo-dimerizing polymer and a photo-decomposing polymer.

The photo-dimerizing polymer has a photosensitive group of photo-dimerization type at the side chain. Two photosensitive groups of photo-dimerization type react to form a ring through additional reaction when exposed to light (preferably, ultraviolet light), and thereby the polymers are dimerized through the additional reaction. The photo-dimerization reaction is described in "Photosensitive polymer" (Kan Nagamatsu, Kodansha 1977).

The photosensitive group of photo-dimerization type preferably comprises (a) carbonyl group or (b) ethylenically unsaturated bond, and (c) aromatic group or (d) heterocyclic group. The group more preferably has both of (a) carbonyl group and (b) ethylenically unsaturated bond, and (c) aromatic group is preferred to (d) heterocyclic group. Namely, the photosensitive group of photo-dimerization type preferably comprises (a) carbonyl group, (b) ethylenically unsaturated bond and (c) aromatic group.

The carbonyl group (a) is preferably contained in an acyl group, an acyloxy group or an alkoxycarbonyl group.

The ethylenically unsaturated bond (b) is preferably in cis form to in trans form. If plural ethylenically unsaturated bonds are contained, they are preferably conjugated.

In the functional group having (a) carbonyl group, (b) ethylenically unsaturated bond and (c) aromatic group, those groups are preferably linked in the form of (main chain)-(a)-(b)-(c). Examples of the functional group having (a), (b) and (c) include cinnamoyl and phenylmaleimide.

The compound having cinnamoyl is described in Jpn. J. Appl. Phys., 31. pp. 2155 (1992).

In the photo-dimerizing polymer, the main chain and the side chain are linked through an ester bond preferably containing (a) carbonyl group.

The ethylenically unsaturated bond (b), the aromatic group (c) and the heterocyclic group (d) may have substituent groups. Examples of the substituent group include an alkyl group (e.g., methyl, ethyl, propyl, butyl, hexyl), an alkoxy group (e.g., methoxy, ethoxy, propoxy, butoxy), an alkenyl group (e.g., allyl), an alkenyloxy group (e.g., allyloxy), aryl groups (e.g., phenyl), an aryloxy group (e.g., phenoxy), cyano, an alkoxycarbonyl group (e.g., methoxycarbonyl, ethoxycarbonyl), hydroxyl, an alkyl-substituted amino group (e.g., dimethylamino, diethylamino) and nitro. Preferred groups are an alkyl group having 1 to 6 carbon atoms, an alkoxy group having 1 to 6 cabon atoms, cyano and an alkoxycarbonyl group having 1 to 6 carbon atoms.

The photo-dimerizing polymer having a photosensitive group of photo-dimerization type at the side chain can be synthesized in various manners.

For example, compounds (monomers) having a photosensitive group and a polymerizable group are polymerized into the polymer. As the polymerizable group, acryloyl group or methacryloyl group is preferred. The polymer can be easily synthesized by radical polymerization of (meth)acryloyl group. Further, the polymer may be polyester, polyamide, polyimide or polyurethane, which can be synthesized by condensation polymerization of polymerizable group such as hydroxyl, carboxyl, amino or cyanate. In that case, the monomers must have at least two polymerizable groups.

The compound having a photosensitive group may be reacted with a polymer to synthesize the polymer having photosensitive groups. As the polymer reacted with the compound having a photosensitive group, polyvinyl alcohol or poly(meth)acrylic acid is preferred. The linkage between polymer (main chain) and the compound (side chain) is preferably ether bond, ester bond or amide bond.

A typical example of the photo-dimerizing polymer is polyvinyl cinnamate.

Instead of using the photo-dimerizing polymer, a compound having a photosensitive group may be dispersed in a polymer (binder). As the polymer of binder, a (meth)acrylic polymer, polyester or polyurethane is preferred. After the compound having a photosensitive group is dispersed in the binder, a polymerization initiator may be added to polymerize.

Examples of the photo-decomposing polymer include polyimide. The photo-decomposing polyimide is described in Japanese Patent Provisional Publication Nos. 5(1993)-34699, 6(1994)-289399, 8(1996)-122792; and "Abstract of 22nd Forum on liquid crystal", pp. 1672 A17 (1996). The photo-dimerizing polymer is preferred to the photo-decomposing one.

The photo-isomerizing compound is generally known as a photochromic compound. When exposed to light, the photo-isomerizing compound changes the chemical structure, and accordingly changes properties (for example, color). Generally, these changes are reversible.

Examples of the photo-isomerizing compound include azobenzene compounds [described in K. Ichimura et al., Langmuir, vol. 4, page 1214 (1988); K. Aoki et al, Langmuir, vol. 8, page 1007 (1992); Y. Suzuki et al., Langmuir, vol. 8, page 2601 (1992); K. Ichimura et al., Appl. Phys. Lett., vol. 63, No. 4, page 449 (1993); N. Ishizuki, et al., Langmuir, vol. 9, page 3298 (1993); N. Ishizuki, Langmuir, vol. 9, page 857 (1993)], chalcone compounds [described in Nature, 381, pp. 212 (1998)], coumarin compounds [SID '98. Digest, pp. 734 (1998)], hydrozano-β-ketoester compounds [S. Yamamura et al., Liquid Crystals, vol. 13, No. 2, page 189 (1993)], stilbene compounds [K. Ichimura et al., "Papers on polymers", vol. 47, No. 10, page 771 (1990), (Japanese)] and spiropyrone compounds (K. Ichimura et al., Chemistry Letters, page 1063 (1992); K. Ichimura et al., Thin Solid Films, vol. 235, page 101 (1993)].

The photo-isomerizing compound preferably has the double bond of C=C, C=N or N=N. The photochromic compound having the double bond comprises the following indispensable structural elements (1) and (2) and the following optional structural elements (3) to (5):

(1) the double bond structure of C=C, C=N or N=N,
(2) a cyclic structure directly or indirectly connecting to both ends of the above (1),
(3) an optional linking group between the above (1) and (2),
(4) an optional substituent group connecting to the carbon atom in the above (1), and
(5) an optional substituent group connecting to the cyclic structure (2).

The double bond structure (1) is preferably in trans form to in cis form. Two or more double bonds may be contained, and if so they are preferably conjugated.

Examples of the cyclic structure (2) include benzene ring, naphthalene ring and nitrogen-containing heterocyclic ring (e.g., pyridinium ring, benzo pyridinium ring). In the case where the cyclic structure is a nitrogen-containing heterocyclic ring, the carbon atom (not nitrogen atom) in the ring preferably connects to the carbon or nitrogen atom in the double bond (1). The cyclic structure is preferably benzene ring.

Examples of the linking group (3) include —NH— and —CO—. It is, however, preferred for the double bond structure (1) to connect directly to the cyclic structure (2) without the linking group (3).

Examples of the substituent group (4) include an aryl group (e.g., phenyl) and cyano. However, the carbon atom in the double bond structure (1) preferably has no substituent group except the structure (2). This means that the structure (1) is preferably —CH=CH— or —CH=N—.

Examples of the substituent group (5) include an alkoxy group (e.g., methoxy, hexyloxy), cyano, an alkyl group (e.g., butyl, hexyl) and an alkylamino group (e.g., dimethylamino).

If the cyclic structure (2) is benzene, the substituent group is positioned preferably at para-position. As described after, in the case where a photochromic compound is chemically combined with the polymer, a functional group for connecting to the polymer is introduced as the substituent group (5) into the photo-isomerizing compound.

When the photo-isomerizing compound is used, it is preferably combined chemically with the polymer. The polymer is preferably hydrophilic (e.g., gelatin, polyvinyl alcohol). Polyvinyl alcohol is particularly preferred.

The reaction between the photo-isomerizing compound and the polymer is determined according to the kind of the polymer (particularly, the kind of the functional group). For example, if the polymer is a hydroxyl-containing polymer such as polyvinyl alcohol, the reaction between acid halide and hydroxyl can be adopted to combine the photo-isomerizing compound with the polymer. In detail, a halogenated acyl group (—COX in which X is halogen) is introduced as a substituent group into the photo-isomerizing compound, and the chemical linkage is formed through the reaction between the halogenated acyl group and hydroxyl in the polymer:

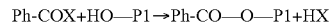

Ph-COX+HO—P1→Ph-CO—O—P1+HX in which Ph is the photo-isomerizing compound, and P1 is the main chain of the polymer.

The photo-orienting compound (photo-reactive compound or photo-isomerizing compound) preferably contains, as the photo-orienting functional group, azobenzene structure, stilbene structure, cinnamoyl structure, chalcone structure, coumarin structure or polyimide structure. Preferred photo-orienting functional groups are azobenzene structure, stilbene structure, cinnamoyl structure, chalcone structure and coumarin structure. Particularly preferred functional groups are cinnamoyl structure, chalcone structure and coumarin structure.

In the case where the photo-orienting compound and the liquid crystal compound are used in combination, the optically anisotropic discontinuous phase contains the photo-orienting compound preferably in an amount of 0.05 to 10 wt. %, more preferably in an amount of 0.1 to 5 wt. %.

Examples of the photo-orienting compound are shown below in the form of repeating unit in the polymer. The polymer may be a copolymer having other repeating units.

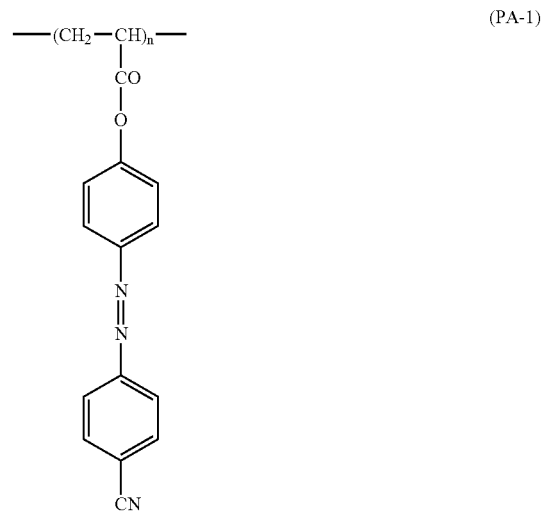

-continued
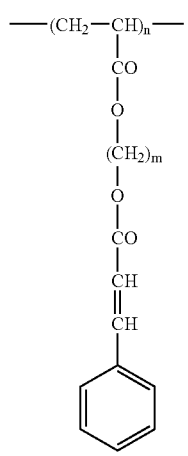
(PA-2)
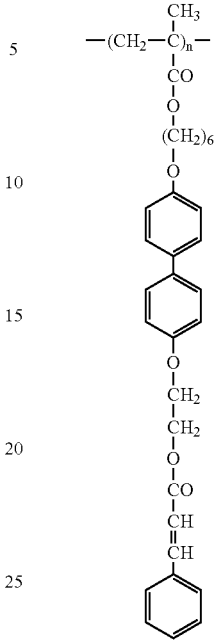
(PA-5)
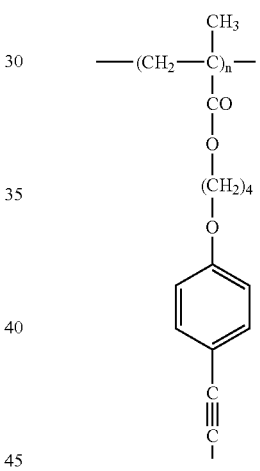
(PA-3)
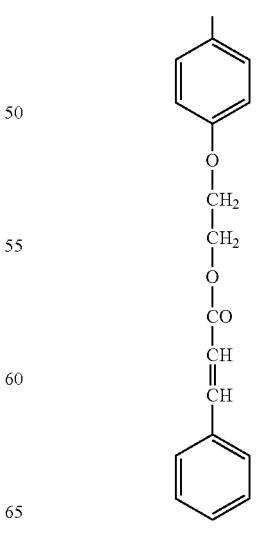
(PA-6)
(PA-4)

The liquid crystal compound preferably comprises three or more π conjugations. For showing satisfying optical anisotropy, the liquid crystal compound preferably has very different refractive indexes for ordinary ray and extraordinary ray. Further, the liquid crystal compound preferably forms nematic phase or smectic phase. Rod-like liquid crystal compounds are particularly preferred.

Examples of the rod-like liquid crystal compounds include azomethines, azoxys, cyanobiphenyls, cyanophenyl esters, benzoic esters, phenyl esters of cyclohexanecarboxylates, cyanophenylcyclohexanes, cyano-substituted phenylpyrimidines, alkoxy-substituted phenylpyrimidines, phenyldioxanes, tolanes and alkenylcyclohexylbenzonitriles. Metal complexes are also included in the rod-like liquid crystal compounds.

Descriptions of the rod-like liquid crystal compounds are found in "Kagaku-Sosetsu, Ekisho no Kageku" (written in Japanese), vol. 22(1994), Chapters 4, 7 and 11; and "Ekisho Devise Handbook" (written in Japanese), chapter 3.

The rod-like liquid crystal compound has a characteristic birefringent index of preferably 0.001 or more, more preferably 0.05 or more, most preferably 0.10 or more. The characteristic birefringent index is also preferably 1.00 or less, more preferably 0.70 or less.

The rod-like liquid crystal compound preferably comprises a polymerizable, group. As the polymerizable group, an unsaturated polymerizable group, an epoxy group and an aziridinyl group are preferred. An unsaturated polymerizable group is more preferred, and an ethylenically unsaturated group is most preferred.

The rod-like liquid crystal compound preferably has a symmetric structure with respect to the short axis, and hence it preferably has the polymerizable groups at each end.

Examples of the rod-like liquid crystal compound are shown below.

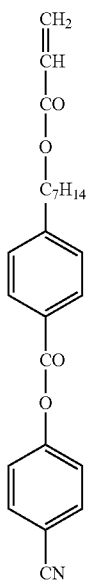

(N1)

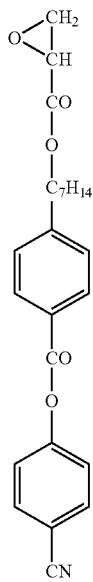

(N2)

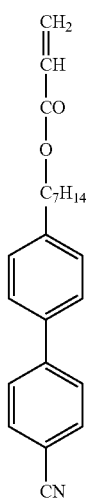

(N3)

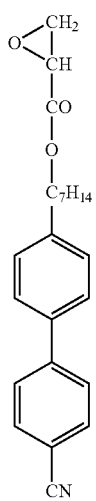

(N4)

(N5) 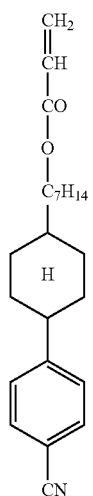
(N6) 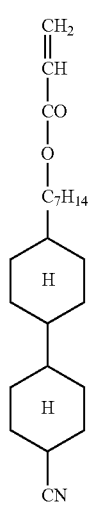
(N7) 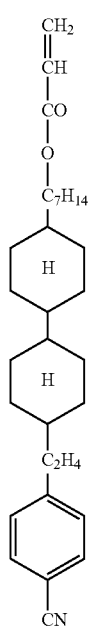
(N8) 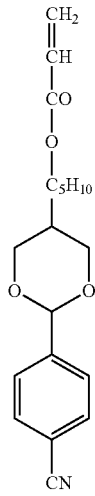
(N9) 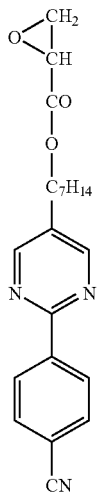
(N10) 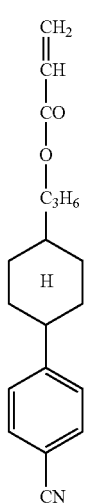

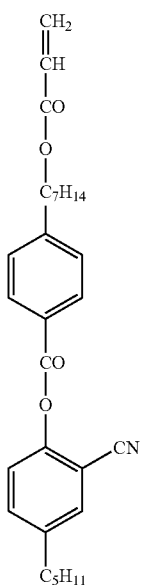 (N10)
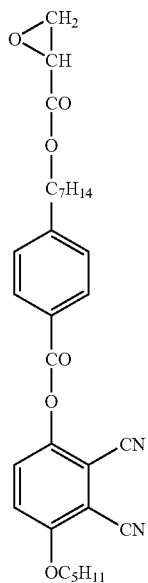 (N12)
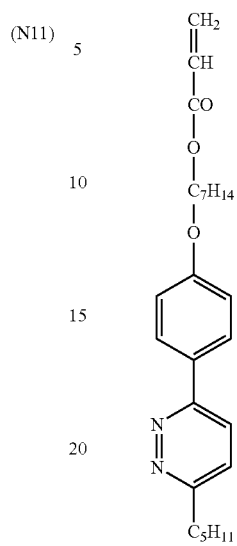 (N11)
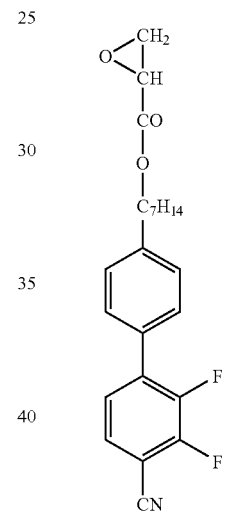 (N14)
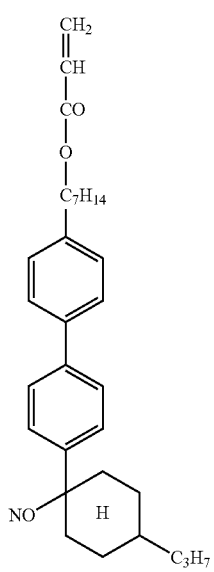 (N15)

-continued
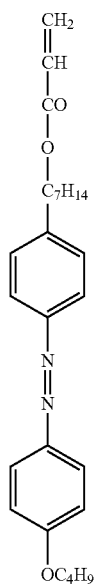
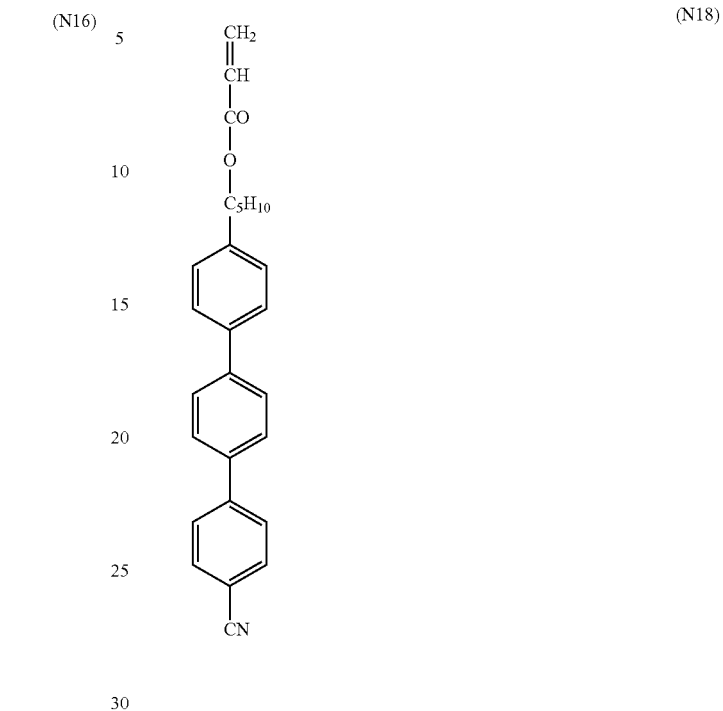
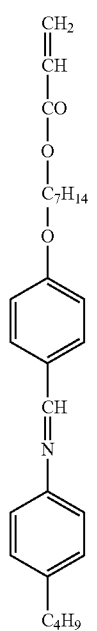
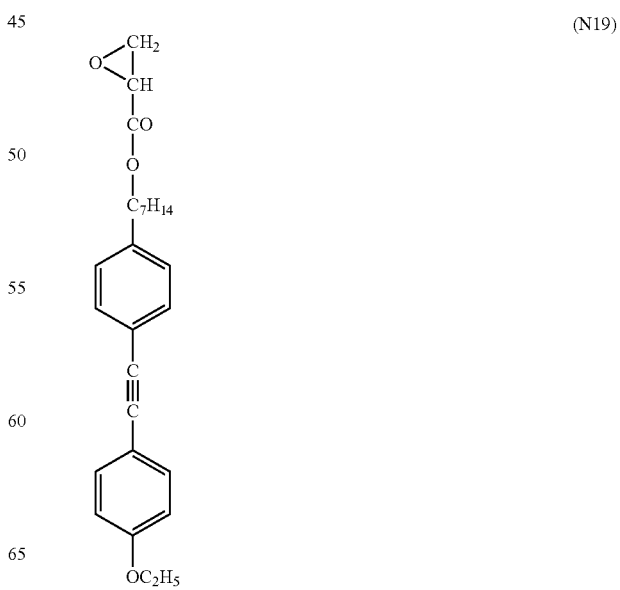

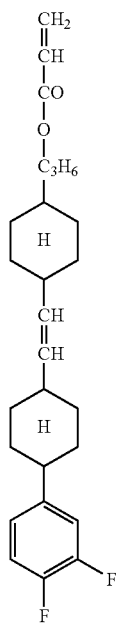 (N20)
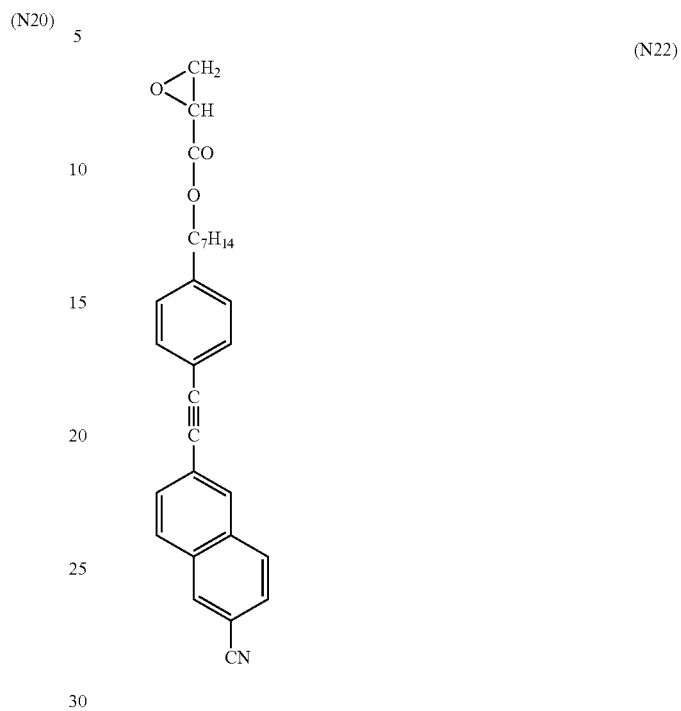 (N22)
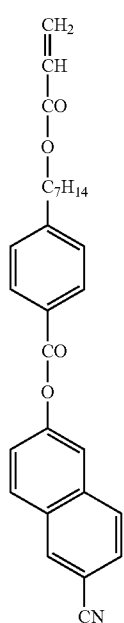 (N21)
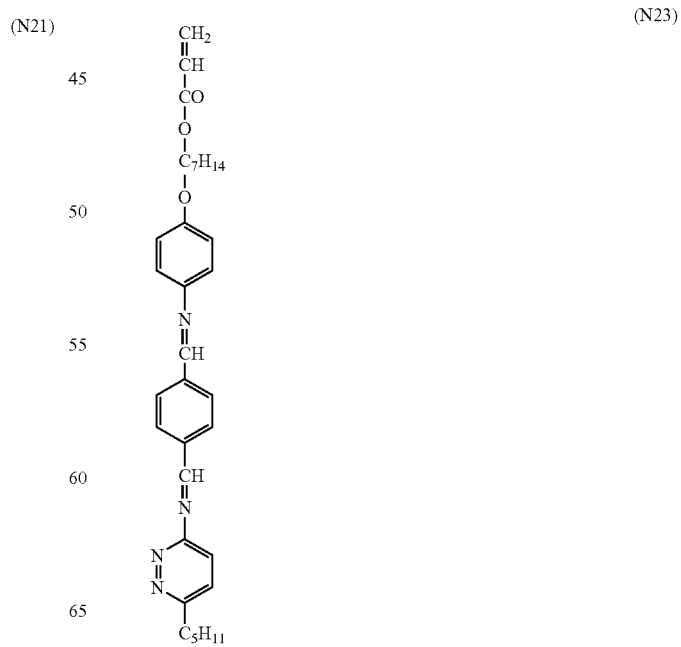 (N23)

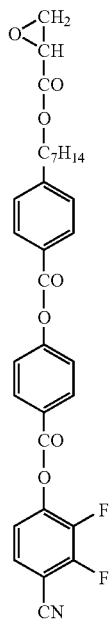
(N24)
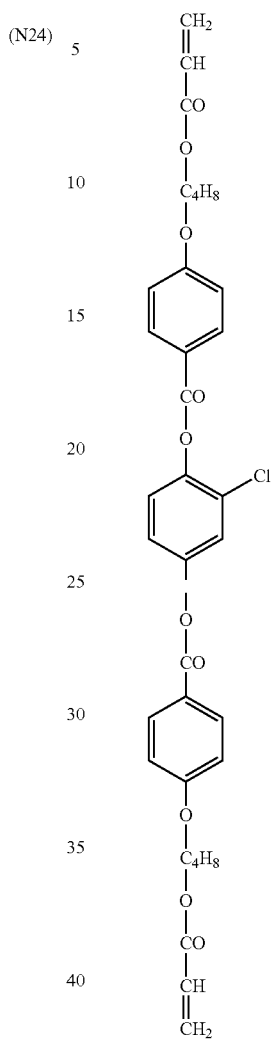
(N25)
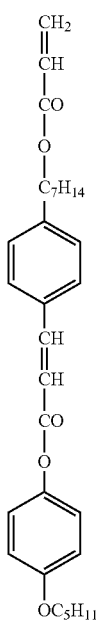
(N26)
(N27)

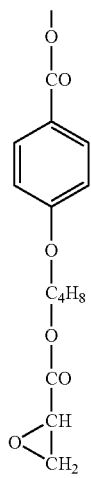
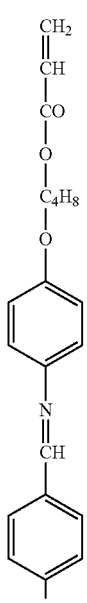
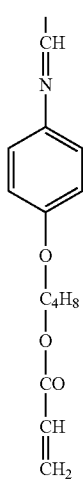
(N28)
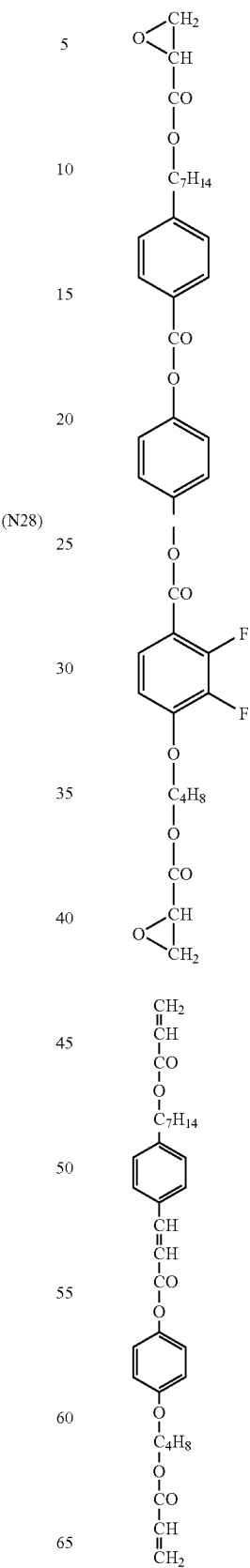
(N29)
(N30)

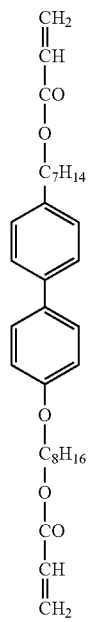
(N31)
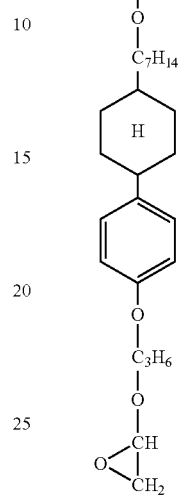
(N33)
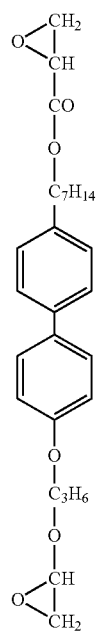
(N32)
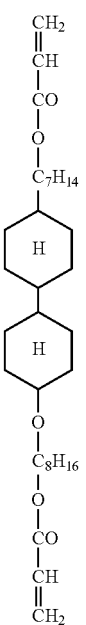
(N34)

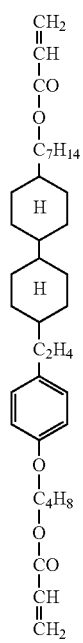
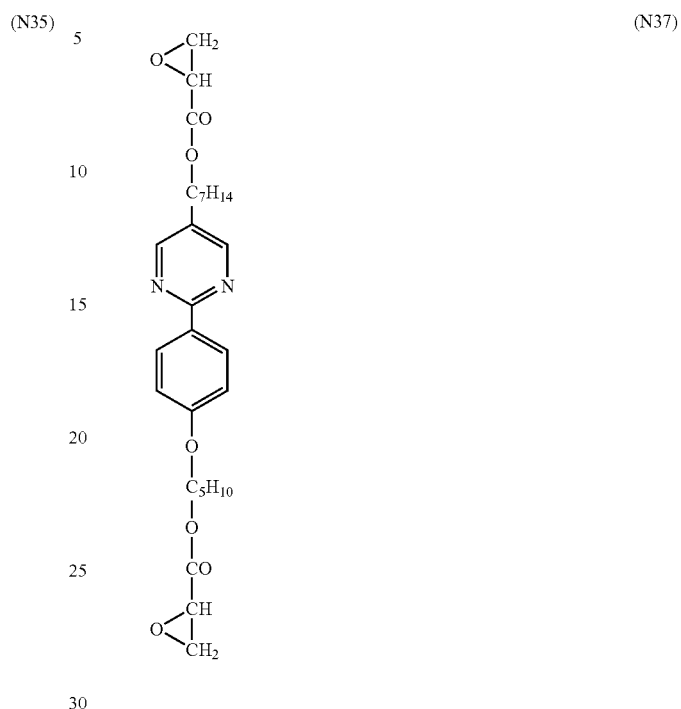
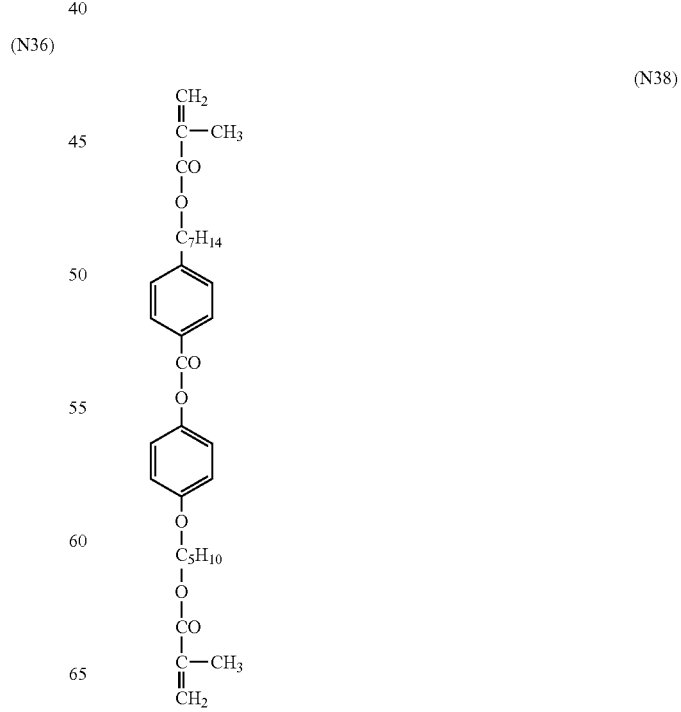

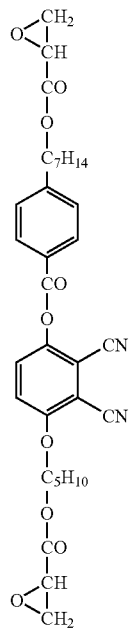
(N39)
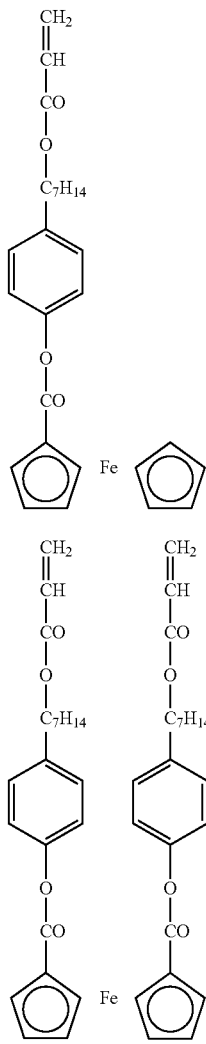
(N41)
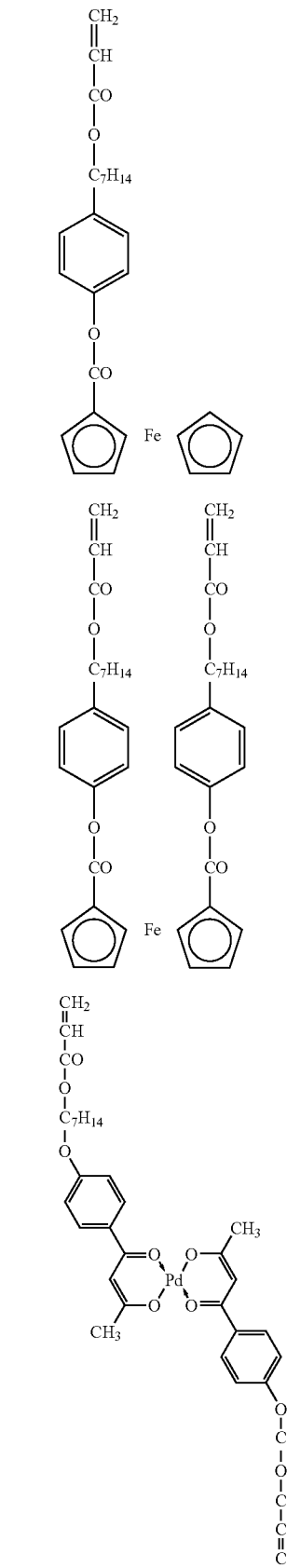
(N42)
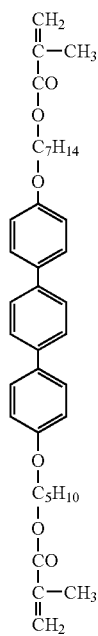
(N40)
(N43)

(N44)
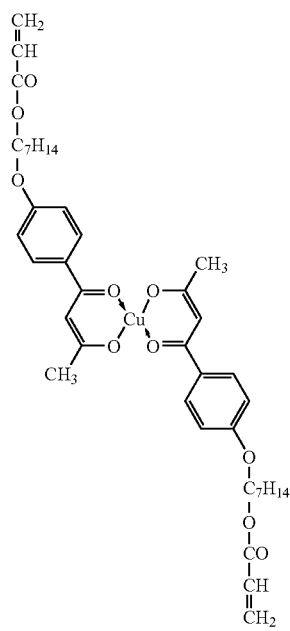
(N45)
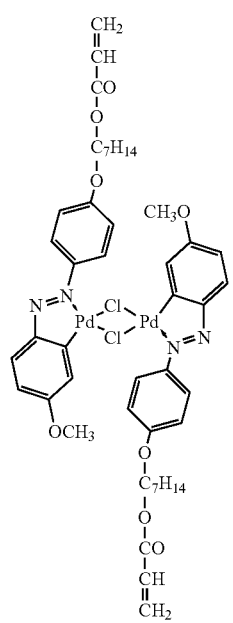
(N46)
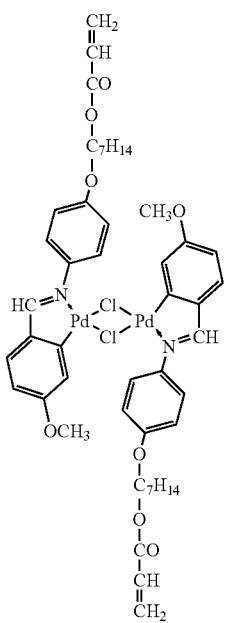
(N47)
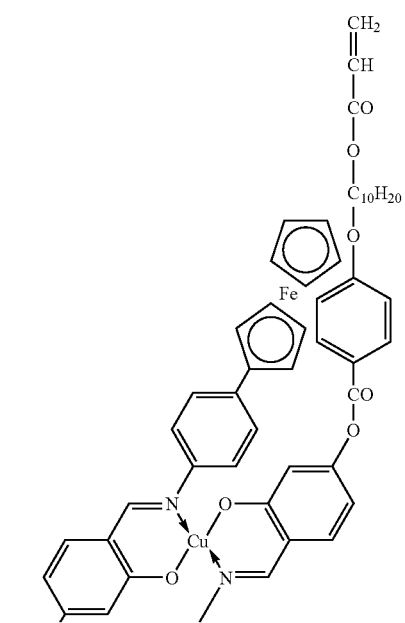

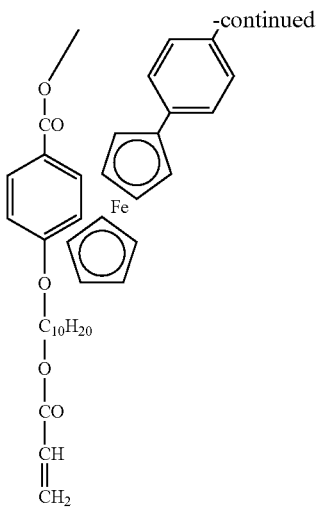
-continued

Two or more kinds of the photo-reactive compounds, the photo-isomerizing compounds or the liquid crystal compounds may be used in combination. Besides the photo-reactive compound, the photo-isomerizing compound or the liquid crystal compound, the optically anisotropic discontinuous phase may further contain a plasticizer, a binder polymer or a photo-polymerization initiator, if needed. The plasticizer is preferably polymerizable.

(Formation of Polarizing Layer of Light-Scattering Polarizing Element)

The polarizing layer of the light-scattering polarizing element can be formed through the following steps (I) to (III):

(I) emulsifying or dispersing the material for the optically anisotropic discontinuous phase in the material (generally, polymer solution) for the optically isotropic continuous phase, (II) applying the prepared coating solution onto a support, followed by drying, and (III) exposing the formed film to light in a certain direction, or stretching the film in a certain direction, so as to develop the optical anisotropy of the optically anisotropic discontinuous phase (to align liquid crystal molecules if the discontinuous phase comprises the liquid crystal compound).

In the step (I), a stirring machine (e.g., homogenizer) or a mixer (e.g., sand mill, colloid mill) is preferably used to emulsify or disperse the materials.

For making the particle sizes of the optically anisotropic discontinuous phase fine and even, a surface active agent may be added. The surface active agent also improves dispersion stability of the optically anisotropic discontinuous phase. If the optically isotropic continuous phase contains water as the solvent (if the optically isotropic continuous phase comprises an water-soluble polymer), the surface active agent is particularly effective. The surface active agent may be nonionic, anionic, cationic or amphoteric.

The nonionic surface active agent is, for example, polyoxyethylene, polyoxypropylene, polyoxybutylene, polyglycidyl or sorbitan. Examples of the nonionic surface active agent include polyoxyethylenealkylether, polyoxyethylenealkylphenylether, polyoxyethylene-polyoxypropyleneglycol, partial ester of polyhydric alcohol with fatty acid, partial ester of polyoxyethylenepolyhydric alcohol with fatty acid, polyoxyethylene fatty acid ester, polyglycelol fatty acid ester, fatty acid diethanolamide and partial ester of triethanolamine with fatty acid.

The anionic surface active agent is, for example, carboxylate, sulfate, sulfonate or phosphate. Examples of the anionic surface active agent include fatty acid salt, alkylbenzenesulfonate, alkylnaphthalenesulfonate, alkylsulfonate, α-olefinsulfonate, dialkylsulfosuccinate, α-sulfonated fatty acid salt, N-methyl-N-oleyltaurine, petroleum sulfonate, alkylsulfonate, sulfonated oil, polyoxyethylenealkylethersulfate, polyoxyethylenealkylphenylethersulfate, polyoxyethylenestyrenated phenylethersulfate, alkylphosphate, polyoxyethylenealkyletherphosphate, and naphthalenesulfonate-formaldehyde condensation product.

The cationic surface active agent is, for example, amine salt, quaternary ammonium salt and pyridinium salt. Examples of the cationic surface active agent include primary, secondary or tertiary amine salt, tetraalkylammonium salt, trialkylbenzylammonium salt, alkylpyridinium salt or alkylimidazolium salt).

The amphoteric surface active agent is, for example, carboxylbetaine or sulfobataine. Examples of the amphoteric surface active agent include N-trialkyl-N-carboxymethylammoniumbetaine and N-trialkyl-N-sulfonealkylammoniumbetaine.

Those surface active agents are described in "Application of Surface Active Agent (written in Japanese)", written by Takao Karimai, published by Sachi-Shobo (1980). The amount of surface active agent is preferably in the range of 0.001 to 1 g, more preferably in the range of 0.01 to 0.1 g based on 1 g of the discontinuous phase.

The step (II) can be performed by known coating methods (e.g., dip coating method, air-knife coating method, curtain coating method, roller coating method, wire bar coating method, direct gravure coating method, extrusion coating method, spin coating method, print coating method, spray coating method and slide coating method). Methods by which continuous coating is possible are preferred. Examples of such coating methods include dip coating method, curtain coating method, extrusion coating method (described in U.S. Pat. No. 2,681,294), roller coating method and slide coating method.

Two or more layers (a polarizing layer consisting of two or more sub-layers, or a polarizing layer and other layers) can be simultaneously formed. The simultaneous coating method is described in U.S. Pat. Nos. 2,761,791, 2,941,898, 3,508,9847, 3,526,528 and "Coating Engineering (written in Japanese)", written by Yuzi Harazaki, pp. 253(1973), published by Asakura-Shoten. In the case that the particle sizes of optically anisotropic discontinuous phase are to be distributed along the thickness in the polarizing layer, it is preferred to adopt the multi-layered coating method of C-type.

The polarizing layer has a thickness of preferably 0.1 μm or more, more preferably 1 μm or more, further preferably 3 μm or more, most preferably 10 μm or more. On the other hand, the thickness is preferably 1,000 μm or less, more preferably 500 μm or less, further preferably 300 μm or less, furthermore preferably 100 μm or less, most preferably 70 μm or less.

The polarizing layer can be formed, for example, by the steps of applying the coating solution onto a support (for example, an endless support such as a drum or a band) as described above, drying and peeling the formed film, exposing to light or stretching the film in the step (III), and then laminating the film on the transparent support. Otherwise, after the solution is applied on the transparent support, the formed film may be directly stretched or esposed to light in the step (III). Further, the polarizing layer is formed on a support, stretched or esposed to light, and then transferred onto the transparent support.

For the exposure in the step (III), linearly polarized light is preferably used. The light is preferably applied in one direction, which means that the traveling direction of light projected onto the layer plane is preferably in one direction. The direction may be parallel or perpendicular to the plane.

The wavelength of the light is generally in the region of 190 to 1,600 nm, preferably in the range of not longer than 320 nm (in ultraviolet region). The wavelength is practically determined according to the photo-orienting functional group in the photo-orienting compound.

As the light source used in the step (III), a mercury lamp, a xenon lamp, a fluorescent lamp, a metal halide lamp, a chemical lamp and an inert gas laser are preferably used. Ultraviolet light emitted from the light source is polarized through a polarizing element. The polarizing element is preferably a prismatic element (e.g., Glan-Thompson prism) or a reflection element based on Brewster angle. If the light emitted from the inert gas laser is naturally polarized, the polarizing element is not necessary.

In the case where the light is not polarized, it must be obliquely applied. Polym. Mater. Sci. Eng., 66 pp. 263(1992) describes that obliquely applied light develops optical anisotropy (aligns liquid crystal molecules).

The amount of exposure is preferably not less than 1 mJ/cm$^2$, more preferably not less than 10 mJ/cm$^2$, further preferably not less than 20 mJ/cm$^2$, furthermore preferably not less than 40 mJ/cm$^2$, and most preferably not less than 80 mJ/cm$^2$. On the other hand, the amount of exposure is preferably not more than 10 J/cm$^2$, more preferably not more than 2 J/cm$^2$, further preferably not more than 1 J/cm$^2$, and most preferably not more than 500 mJ/cm$^2$.

The intensity of exposure is preferably in the range of 20 to 2,000 mW/cm$^2$, more preferably in the range of 40 to 1,000 mW/cm$^2$, most preferably in the range of 80 to 500 mW/cm$^2$. For developing the optical anisotropy in short time, the film is exposed to light while heated.

For the stretching in the step (III), a stretching treatment of high extension ratio (4 to 10 times), which is performed for preparing the light-absorbing polarizing element, is not necessary. In consideration of productivity, the extension ratio is 3.0 times or less. It is preferably 2.0 times or less, more preferably 1.5 times or less, further preferably 1.3 times or less, furthermore preferably 1.2 times or less, and most preferably 1.1 times or less. On the other hand, in consideration of effect, the extension ratio is preferably 1.01 times or more.

The above stretching of low extension ratio can align the molecules in a large area easily, as compared with other methods. Further, it can give large birefringence to the discontinuous phase, as compared with other methods. Consequently, even and large scattering characters can be realized in a large area of the light-scattering polarizing element.

In other words, the stretching of low extension ratio can give an optical film having excellent optical characters in which the maximum and minimum transmittances for all rays in the polarizing plane perpendicular to the film plane are not less than 75% and less than 60%, respectively.

(Light-Absorbing Polarizing Element)

The light-absorbing polarizing element selectively transmits particular polarized light, and selectively absorbs other polarized light. The "particular polarized light" and the "other polarized light" generally have polarizing planes crossing perpendicularly to each other.

The polarizing layer of the light-absorbing polarizing element is generally a film of polyvinyl alcohol. For preparing the polarizing layer, a polyvinyl alcohol film is stretched and made to adsorb iodine or a dichromatic dye. The resultant light-absorbing polarizing element has a transparent axis (polarizing axis) perpendicular to the stretching direction.

The light-absorbing polarizing element preferably has a polarization degree of 99% or more. The "polarization degree" is defined by the following formula:

$$\text{polarization degree} = 100 \times \{(P-C)/(P+C)\}^{1/2}$$

in which P is a transmittance of light passing through two polarizing elements placed so that their transmission axes may be parallel; and C is a transmittance of light passing through two polarizing elements placed so that their transmission axes may be perpendicular to each other.

A commercially available light-absorbing polarizing element may be used for the invention.

(Polarizing Plate)

The polarizing elements of light-scattering type and light-absorbing type are laminated to prepare a polarizing plate. The elements are placed so that the transmission axis of the element of light-scattering type may be essentially parallel to that of the element of light-absorbing type.

The polarizing plate functions as a linearly polarizing plate. If the plate is laminated on a λ/4 plate, the obtained layered composition works as a circularly polarizing plate. In the circularly polarizing plate, the (linearly) polarizing plate and the λ/4 plate are placed so that the transmission axis of the polarizing plate may be essentially at the angle of 45° to the slow axis of the λ/4 plate. The λ/4 plate, the light-scattering polarizing element and the light-absorbing polarizing element are piled up generally in this order from a backlight side in a liquid crystal display equipped with the circularly polarizing plate.

An anti-reflection layer can be provided on the surface of polarizing layer side in the light-scattering polarizing element. The anti-reflection layer reduces reflection, and consequently improves brightness of the display. The anti-reflection layer may be a layered composition of low and high refractive index layers (described in Nippon Shashingakkaisi [Bulletin of Japan Photography Society (written in Japanese)], 29(1966), 137), or it may consist of only a low refractive index layer.

The polarizing plate can be used in combination with an optical compensatory sheet in the liquid crystal display. If so, the viewing angel of the display is so remarkably improved that an image of high brightness is obtained. The optical compensatory sheet preferably comprises a transparent support and a thereon-provided optically anisotropic layer formed from a discotic liquid crystal compound (described in Japanese Patent No. 2,587,398).

In contrast with the above-described transparent support of the polarizing plate, the transparent support of the optical compensatory sheet preferably has optical anisotropy.

As described in Japanese Patent Provisional Publication No. 7(1995)-191217, the optical compensatory sheet can be unified with the polarizing plate.

(Liquid Crystal Display)

The polarizing plate is installed in a liquid crystal display. The present invention is particularly effective in the case where the liquid crystal display has a liquid crystal cell of twist nematic mode, bend alignment mode or horizontal aligning mode.

In a liquid crystal display of transmission type, two polarizing plates are provided on both sides (backlight side and observer side) of the liquid-crystal cell. If the polarizing plate of the invention is used, the efficiency of light in the display is improved.

The liquid crystal cell of twist nematic (TN) mode is commonly used (particularly, in a TFT liquid crystal display), and accordingly is described in various publications.

A layered composition in which the polarizing plate of the invention and the optical compensatory sheet comprising an optically anisotropic transparent support and a thereon-provided optically anisotropic layer formed from a discotic liquid crystal compound are unified can be installed in the liquid crystal display of twist nematic mode. In that case, the optically anisotropic transparent support and the optically anisotropic layer are placed so that the average direction in which normals of the disc planes of discotic liquid crystal molecules are projected onto the support may be essentially perpendicular or parallel to the slow axis in plane of the support. Further, the optically anisotropic transparent support and the polarizing plate are placed so that the slow axis in plane of the support may be essentially perpendicular or parallel to the transmission axis of the polarizing plate.

In the liquid crystal cell of bend alignment mode, liquid crystal molecules at the central part may be oriented in a twisted alignment.

For ensuring both satisfying brightness and a wide viewing angle, the refractive anisotropy of liquid crystal compound ($\Delta n$) and the thickness of liquid crystal layer (d) in the liquid crystal cell of bend alignment mode are set so that the product thereof ($\Delta n \times d$) may be preferably in the range of 100 to 2,000 nm, more preferably in the range of 150 to 1,700 nm, most preferably in the range of 500 to 1,500 nm.

The layered composition in which the polarizing plate of the invention and the optical compensatory sheet comprising an optically anisotropic transparent support and a thereon-provided optically anisotropic layer formed from a discotic liquid crystal compound are unified can be also installed in the liquid crystal display of bend alignment mode. In that case, the optically anisotropic transparent support and the optically anisotropic layer are placed so that the average direction in which normals of the disc planes of discotic liquid crystal molecules are projected onto the support may be essentially at the angle of 45° to the slow axis in plane of the support. Further, the transparent support and the polarizing plate are placed so that the slow axis in plane of the support may be essentially perpendicular or parallel to the transmission axis of the polarizing plate.

In the liquid crystal cell of horizontal aligning mode, for ensuring both satisfying brightness and a wide viewing angle, the refractive anisotropy of liquid crystal compound ($\Delta n$) and the thickness of liquid crystal layer (d) are set so that the product thereof ($\Delta n \times d$) may be preferably in the range of 100 to 2,000 nm, more preferably in the range of 100 to 1,000 nm, most preferably in the range of 100 to 700 nm.

The layered composition in which the polarizing plate of the invention and the optical compensatory sheet comprising an optically anisotropic transparent support and a thereon-provided optically anisotropic layer formed from a discotic liquid crystal compound are unified can be also installed in the liquid crystal display of horizontal aligning mode. In that case, the optically anisotropic transparent support and the optically anisotropic layer are placed so that the average direction in which normals of the disc planes of discotic liquid crystal molecules are projected onto the support may be essentially at the angle of 45° to the slow axis in plane of the support. Further, the optically anisotropic transparent support and the polarizing plate are placed so that the slow axis in plane of the support may be essentially perpendicular or parallel to the transmission axis of the polarizing plate.

Any of the above liquid crystal cells can be used in normally white (NW) mode or in normally black (NB) mode.

EXAMPLE 1

(Measurement of Refractive Index)

It is difficult to measure the refractive index after the polarizing element is produced, and hence the refractive indexes of the optically isotropic continuous phase and the optically anisotropic discontinuous phase were measured before the element is produced.

For preparing a coating solution for the optically isotropic continuous phase, 10 weight parts of gelatin (polymer matrix of optically isotropic continuous phase) was added into 90 weight parts of water, and heated to dissolve. The prepared solution was applied onto a plate of high refractive glass, and dried to form a gelatin film (optically isotropic continuous phase). The refractive index of the gelatin film was measured by means of an Abbe's refractometer at D-line of sodium, and thereby found 1.54 in any direction.

A photo-orienting polymer (PA-5, photo-dimerizing polymer) was dissolved in dichloromethane to prepare a 30 wt. % solution. The solution was applied onto a plate of high refractive glass, dried and exposed to linearly polarized light (200 mW/cm$^2$) at 365 nm for 10 seconds at room temperature. The refractive index of the thus-formed film of photo-orienting polymer (optically anisotropic phase) was measured by means of an Abbe's refractometer, and thereby found 1.64 (ne) and 1.54 (n0) in the directions parallel and perpendicular to the polarizing direction, respectively.

(Production of Light-Scattering Polarizing Element)

In 90 weight parts of water, 10 weight parts of gelatin was added and heated to dissolve. To the obtained solution, 2 weight parts of 30 wt. % dichloromethane solution of photo-orienting polymer (PA-5, photo-dimerizing polymer) was added and emulsified by means of a homogenizer.

Independently, an undercoating layer made of gelatin was formed on a cellulose triacetate film (transparent support). The above-prepared emulsion was applied on the undercoating layer, and dried to form a film layer (thickness: 30 μm). The film layer was exposed to linearly polarized light (200 mW/cm$^2$) at 365 nm for 10 seconds at room temperature, to produce a light-scattering polarizing element.

(Production of Polarizing Plate)

The obtained light-scattering polarizing element and a commercially available light-absorbing polarizing element were laminated with an adhesive to produce a polarizing plate.

The produced polarizing plate was placed on a backlight for a liquid crystal display. The transmission axis of the element of light-scattering type (direction in which the refractive index of the optically isotropic continuous phase is essentially the same as that of the optically anisotropic discontinuous phase) was positioned parallel to the transmission axis of the element of light-absorbing type. The transmittance of the thus-placed plate was measured and found 45%.

EXAMPLE 2

(Measurement of Refractive Index)

A photo-orienting polymer (PA-1, photo-isomerizing polymer) was dissolved in cyclohexanone to prepare a 30 wt. % solution. The solution was applied onto a plate of high refractive glass, dried and exposed to linearly polarized light (200 mW/cm$^2$) at 435 nm for 10 seconds at room temperature. The refractive index of the thus-formed film of photo-orienting polymer (optically anisotropic phase) was measured by means of an Abbe's refractometer, and thereby found 1.54

(ne) and 1.62 (nO) in the directions parallel and perpendicular to the polarizing direction, respectively.

(Production of Light-Scattering Polarizing Element)

In 90 weight parts of water, 10 weight parts of gelatin was added and heated to dissolve. To the obtained solution, 2 weight parts of 30 wt. % cyclohexanone solution of photo-orienting polymer (PA-1, photo-isomerizing polymer) was added and emulsified by means of a homogenizer.

Independently, an undercoating layer made of gelatin was formed on a cellulose triacetate film (transparent support). The above-prepared emulsion was applied on the undercoating layer, and dried to form a film layer (thickness: 30 µm). The film layer was exposed to linearly polarized light (200 mW/cm$^2$) at 435 nm for 10 seconds at room temperature, to produce a light-scattering polarizing element.

(Production of Polarizing Plate)

The obtained light-scattering polarizing element and a commercially available light-absorbing polarizing element were laminated with an adhesive to produce a polarizing plate.

The produced polarizing plate was placed on a backlight for a liquid crystal display. The transmission axis of the element of light-scattering type (direction in which the refractive index of the optically isotropic continuous phase is essentially the same as that of the optically anisotropic discontinuous phase) was positioned parallel to the transmission axis of the element of light-absorbing type. The transmittance of the thus-placed plate was measured and found 44.5%.

EXAMPLE 3

(Measurement of Refractive Index)

A photo-orienting polymer (PA-5, photo-dimerizing polymer) in the amount of 10 weight parts and a rod-like liquid crystal compound (N26) in the amount of 90 weight parts were mixed. The mixture was dissolved in dichloromethane to prepare a 30 wt. % solution. The solution was applied onto a plate of high refractive glass, dried, exposed to linearly polarized light (200 mW/cm$^2$) at 365 nm for 10 seconds at room temperature, and then further exposed to non-polarized light (200 mW/cm$^2$) at 310 nm for 10 seconds so that the molecules of the rod-like liquid crystal compound might be polymerized to fix the alignment. The refractive index of the thus-formed film (optically anisotropic phase) was measured by means of an Abbe's refractometer, and thereby found 1.66 (ne) and 1.54 (nO) in the directions parallel and perpendicular to the polarizing direction, respectively.

(Production of Light-Scattering Polarizing Element)

In 90 weight parts of water, 10 weight parts of gelatin was added and heated to dissolve. To the obtained solution, 2 weight parts of 30 wt. % dichloromethane solution of a mixture consisting of 10 weight parts of photo-orienting polymer (PA-5, photo-dimerizing polymer) and 90 weight parts of a liquid crystal compound (N26) was added and emulsified by means of a homogenizer.

Independently, an undercoating layer made of gelatin was formed on a cellulose triacetate film (transparent support). The above-prepared emulsion was applied on the undercoating layer, and dried to form a film layer (thickness: 30 µm). The film layer was exposed to linearly polarized light (200 mW/cm$^2$) at 365 nm for 10 seconds at room temperature, and further exposed to non-polarized light (200 mW/cm$^2$) at 310 nm for 10 seconds so that the molecules of the rod-like liquid crystal compound might be polymerized to fix the alignment. Thus, a light-scattering polarizing element was produced.

(Production of Polarizing Plate)

The obtained light-scattering polarizing element and a commercially available light-absorbing polarizing element were laminated with an adhesive to produce a polarizing plate.

The produced polarizing plate was placed on a backlight for a liquid crystal display. The transmission axis of the element of light-scattering type (direction in which the refractive index of the optically isotropic continuous phase is essentially the same as that of the optically anisotropic discontinuous phase) was positioned parallel to the transmission axis of the element of light-absorbing type. The transmittance of the thus-placed plate was measured and found 46%.

EXAMPLE 4

(Measurement of Refractive Index)

A photo-orienting polymer (PA-1, photo-isomerizing polymer) in the amount of 10 weight parts and a rod-like liquid crystal compound (N26) in the amount of 90 weight parts were mixed. The mixture was dissolved in cyclohexanone to prepare a 30 wt. % solution. The solution was applied onto a plate of high refractive glass, dried, exposed to linearly polarized light (200 mW/cm$^2$) at 435 nm for 10 seconds at room temperature, heated at 130° C. for 30 minutes, and then further exposed to non-polarized light (200 mW/cm$^2$) at 310 nm for 10 seconds so that the molecules of the rod-like liquid crystal compound might be polymerized to fix the alignment. The refractive index of the thus-formed film (optically anisotropic phase) was measured by means of an Abbe's refractometer, and thereby found 1.54 (ne) and 1.65 (nO) in the directions parallel and perpendicular to the polarizing direction, respectively.

(Production of Light-Scattering Polarizing Element)

In 90 weight parts of water, 10 weight parts of gelatin was added and heated to dissolve. To the obtained solution, 2 weight parts of 30 wt. % cyclohexanone solution of a mixture consisting of 10 weight parts of photo-orienting polymer (PA-1, photo-isomerizing polymer) and 90 weight parts of a liquid crystal compound (N26) was added and emulsified by means of a homogenizer.

Independently, an undercoating layer made of gelatin was formed on a cellulose triacetate film (transparent support). The above-prepared emulsion was applied on the undercoating layer, and dried to form a film layer (thickness: 30 µm). The film layer was exposed to linearly polarized light (200 mW/cm$^2$) at 435 nm for 10 seconds at room temperature, heated at 130° C. for 30 minutes, and further exposed to non-polarized light (200 mW/cm$^2$) at 310 nm for 10 seconds. Thus, a light-scattering polarizing element was produced.

(Production of Polarizing Plate)

The obtained light-scattering polarizing element and a commercially available light-absorbing polarizing element were laminated with an adhesive to produce a polarizing plate.

The produced polarizing plate was placed on a backlight for a liquid crystal display. The transmission axis of the element of light-scattering type (direction in which the refractive index of the optically isotropic continuous phase is essentially the same as that of the optically anisotropic discontinuous phase) was positioned parallel to the transmission axis of the element of light-absorbing type. The transmittance of the thus-placed plate was measured and found 45.5%.

EXAMPLE 5

(Production of Circularly Polarizing Plate)

The polarizing plate prepared in Example 2 and a λ/4 plate were laminated so that the λ/4 plate might be placed on the light-scattering polarizing element side, to produce a circularly polarizing plate. The transmission axis of the polarizing plate was placed at the angle of 45° to the slow axis of the λ/4 plate in the same plane.

The circularly polarizing plate was placed on a backlight for a liquid crystal display, so that the λ/4 plate in the plate might be on the backlight side. The transmittance of the thus-placed plate was measured and found 49%.

REFERENCE EXAMPLE 1

A commercially available light-absorbing polarizing element was placed on a backlight for a liquid crystal display. The transmittance of the thus-placed element was measured and found 41%.

EXAMPLE 6

(Measurement of Refractive Index)

Gelatin in the amount of 10 weight parts was added into 90 weight parts of water, and heated to dissolve. The prepared solution was applied onto a plate of high refractive glass, and dried to form a gelatin film (optically isotropic continuous phase). The refractive index of the gelatin film was measured by means of an Abbe's refractometer, and thereby found 1.54 in any direction.

A photo-orienting polymer (PA-5, photo-dimerizing polymer) was dissolved in dichloromethane to prepare a 30 wt. % solution. The solution was applied onto a plate of high refractive glass, dried and exposed to linearly polarized light (200 mW/cm$^2$) at 365 nm for 10 seconds at room temperature. The refractive index of the thus-formed film of photo-orienting polymer (optically anisotropic phase) was measured by means of an Abbe's refractometer, and thereby found 1.64 (ne) and 1.54 (n0) in the directions parallel and perpendicular to the polarizing direction, respectively.

(Production of Light-Scattering Polarizing Element)

In 90 weight parts of water, 10 weight parts of gelatin was added and heated to dissolve. To the obtained solution, 2 weight parts of 30 wt. % dichloromethane solution of photo-orienting polymer (PA-5, photo-dimerizing polymer) was added and emulsified by means of a homogenizer.

On a cellulose triacetate film (transparent support) having a gelatin undercoating layer, the prepared emulsion was applied and dried to form a film layer. The film layer was exposed to linearly polarized light (200 mW/cm$^2$) at 365 nm for 10 seconds at room temperature, to produce a light-scattering polarizing element.

(Production of Polarizing Plate)

A stretched polyvinyl alcohol film was made to adsorb iodine, to prepare a light-absorbing polarizing element. On one side of the prepared light-absorbing polarizing element, the above-obtained light-scattering polarizing element was laminated with an adhesive of polyvinyl alcohol type so that the polarizing layer might be outside. On the other side, a cellulose triacetate film (Fujitac, Fiji Photo film Co., Ltd.) was laminated with the adhesive of polyvinyl alcohol type.

The thus-produced polarizing plate was placed on a backlight for a liquid crystal display, so that the light-scattering polarizing element might be on the backlight side. The transmittance of the thus-placed plate was measured and found 46%.

EXAMPLE 7

(Measurement of Refractive Index)

A photo-orienting polymer (PA-1, photo-isomerizing polymer) was dissolved in cyclohexanone to prepare a 30 wt. % solution. The solution was applied onto a plate of high refractive glass, dried, exposed to linearly polarized light (200 mW/cm$^2$) at 435 nm for 10 seconds at room temperature, and then heated at 130° C. for 30 minutes. The refractive index of the thus-formed film (optically anisotropic phase) was found 1.62 (ne) and 1.54 (n0) in the directions parallel and perpendicular to the polarizing direction, respectively.

(Production of Light-Scattering Polarizing Element)

In 90 weight parts of water, 10 weight parts of gelatin was added and heated to dissolve. To the obtained solution, 2 weight parts of 30 wt. % dichloromethane solution of the photo-orienting polymer (PA-1, photo-isomerizing polymer) was added and emulsified by means of a homogenizer.

On a cellulose triacetate film (transparent support) having a gelatin undercoating layer, the prepared emulsion was applied and dried to form a film layer. The film layer was exposed to linearly polarized light (200 mW/cm$^2$) at 435 nm for 10 seconds at room temperature, and heated at 130° C. for 30 minutes. Thus, a light-scattering polarizing element was produced.

(Production of Polarizing Plate)

A stretched polyvinyl alcohol film was made to adsorb iodine, to prepare a light-absorbing polarizing element. On one side of the prepared light-absorbing polarizing element, the above-obtained light-scattering polarizing element was laminated with an adhesive of polyvinyl alcohol type so that the polarizing layer might be outside. On the other side, a cellulose triacetate film (Fujitac, Fiji Photo film Co., Ltd.) was laminated with the adhesive of polyvinyl alcohol type.

The thus-produced polarizing plate was placed on a backlight for a liquid crystal display, so that the light-scattering polarizing element might be on the backlight side. The transmittance of the thus-placed plate was measured and found 45.5%.

EXAMPLE 8

(Measurement of Refractive Index)

A photo-orienting polymer (PA-5, photo-dimerizing polymer) in the amount of 10 weight parts and a rod-like liquid crystal compound (N26) in the amount of 90 weight parts were mixed. The mixture was dissolved in dichloromethane to prepare a 30 wt. % solution. The solution was applied onto a plate of high refractive glass, dried, exposed to linearly polarized light (200 mW/cm$^2$) at 365 nm for 10 seconds at room temperature, and then further exposed to non-polarized light (200 mW/cm$^2$) at 310 nm for 10 seconds so that the molecules of the rod-like liquid crystal compound might be polymerized to fix the alignment. The refractive index of the thus-formed film (optically anisotropic phase) was found 1.66 (ne) and 1.54 (n0) in the directions parallel and perpendicular to the polarizing direction, respectively.

(Production of Light-Scattering Polarizing Element)

In 90 weight parts of water, 10 weight parts of gelatin was added and heated to dissolve. To the obtained solution, 2 weight parts of 30 wt. % dichloromethane solution of a mixture consisting of 10 weight parts of photo-orienting polymer (PA-5, photo-dimerizing polymer) and 90 weight parts of a liquid crystal compound (N26) was added and emulsified by means of a homogenizer.

On a cellulose triacetate film (transparent support) having a gelatin undercoating layer, the prepared emulsion was applied and dried to form a film layer. The film layer was exposed to linearly polarized light (200 mW/cm$^2$) at 365 nm for 10 seconds at room temperature, and further exposed to non-polarized light (200 mW/cm$^2$) at 310 nm for 10 seconds so that the molecules of the rod-like liquid crystal compound might be polymerized to fix the alignment. Thus, a light-scattering polarizing element was produced.

(Production of Polarizing Plate)

A stretched polyvinyl alcohol film was made to adsorb iodine, to prepare a light-absorbing polarizing element. On one side of the prepared light-absorbing polarizing element, the above-obtained light-scattering polarizing element was laminated with an adhesive of polyvinyl alcohol type so that the polarizing layer might be outside. On the other side, a cellulose triacetate film (Fujitac, Fiji Photo film Co., Ltd.) was laminated with the adhesive of polyvinyl alcohol type.

The thus-produced polarizing plate was placed on a backlight for a liquid crystal display, so that the light-scattering polarizing element might be on the backlight side. The transmittance of the thus-placed plate was measured and found 47%.

EXAMPLE 9

(Measurement of Refractive Index)

A photo-orienting polymer (PA-1, photo-isomerizing polymer) in the amount of 10 weight parts and a rod-like liquid crystal compound (N26) in the amount of 90 weight parts were mixed. The mixture was dissolved in cyclohexanone to prepare a 30 wt. % solution. The solution was applied onto a plate of high refractive glass, dried, exposed to linearly polarized light (200 mW/cm$^2$) at 435 nm for 10 seconds at room temperature, heated at 130° C. for 30 minutes, and then further exposed to non-polarized light (200 mW/cm$^2$) at 310 nm for 10 seconds so that the molecules of the rod-like liquid crystal compound might be polymerized to fix the alignment. The refractive index of the thus-formed film (optically anisotropic phase) was measured and found 1.65 (ne) and 1.54 (n0) in the directions parallel and perpendicular to the polarizing direction, respectively.

(Production of Light-Scattering Polarizing Element)

In 90 weight parts of water, 10 weight parts of gelatin was added and heated to dissolve. To the obtained solution, 2 weight parts of 30 wt. % dichloromethane solution of a mixture consisting of 10 weight parts of photo-orienting polymer (PA-1, photo-isomerizing polymer) and 90 weight parts of a liquid crystal compound (N26) was added and emulsified by means of a homogenizer.

On a cellulose triacetate film (transparent support) having a gelatin undercoating layer, the prepared emulsion was applied and dried to form a film layer. The film layer was exposed to linearly polarized light (200 mW/cm$^2$) at 435 nm for 10 seconds at room temperature, heated at 130° C. for 30 minutes, and further exposed to non-polarized light (200 mW/cm$^2$) at 310 nm for 10 seconds so that the molecules of the rod-like liquid crystal compound might be polymerized to fix the alignment. Thus, a light-scattering polarizing element was produced.

(Production of Polarizing Plate)

A stretched polyvinyl alcohol film was made to adsorb iodine, to prepare a light-absorbing polarizing element. On one side of the prepared light-absorbing polarizing element, the above-obtained light-scattering polarizing element was laminated with an adhesive of polyvinyl alcohol type so that the polarizing layer might be outside. On the other side, a cellulose triacetate film (Fujitac, Fiji Photo film Co., Ltd.) was laminated with the adhesive of polyvinyl alcohol type.

The thus-produced polarizing plate was placed on a backlight for a liquid crystal display, so that the light-scattering polarizing element might be on the backlight side. The transmittance of the thus-placed plate was measured and found 46.5%.

EXAMPLE 10

(Production of Circularly Polarizing Plate)

The polarizing plate prepared in Example 7 and a λ/4 plate were laminated so that the λ/4 plate might be placed on the light-scattering polarizing element side, to produce a circularly polarizing plate. The transmission axis of the polarizing plate was placed at the angle of 45° to the slow axis of the λ/4 plate in the same plane.

The circularly polarizing plate was placed on a backlight for a liquid crystal display, so that the λ/4 plate in the plate might be on the backlight side. The transmittance of the thus-placed plate was measured and found 50%.

EXAMPLE 11

(Production of Optically Anisotropic Transparent Support)

The following components were placed in a mixing tank, and then heated and stirred to dissolve. Thus, a cellulose acetate solution was prepared.

| Components of cellulose acetate solution | |
|---|---|
| Cellulose acetate (acetic acid content: 60.9%) | 100 weight parts |
| TPP (triphenyl phosphate) | 7.8 weight parts |
| BDP (biphenyldiphenyl phosphate) | 3.9 weight parts |
| Methylene chloride | 300 weight parts |
| Methanol | 54 weight parts |
| 1-Butanol | 11 weight parts |

In another mixing tank, the following components were placed, heated and stirred to dissolve. The thus-prepared retardation increasing agent solution in the amount of 22 weight parts was added to 474 weight parts of the above-prepared solution (dope), and stirred well to mix.

| Components of retardation increasing agent solution | |
|---|---|
| 2-Hydroxy-4-benzyloxybenzophenone | 12 weight parts |
| 2,4-benzyloxybenzophenone | 4 weight parts |
| Methylene chloride | 80 weight parts |
| Methanol | 20 weight parts |

The mixture (dope) of the cellulose acetate solution and the retardation increasing agent solution was cast on a drum cooled at 0° C. The formed film was peeled when the solvent content was 70 wt. %, and both ends of the film was fixed with a pin tenter. While the film was set up so that the stretching ratio might be 3% in the direction perpendicular to the machine, the film was dried until the solvent content was 3 to 5 wt. %. The film was then transferred and dried in a heating apparatus equipped with many rollers. The stretching ratio along the tenter was essentially 0% at a temperature higher than 120° C., which is the glass transition temperature. In order to stretch the film along the machine by 4% when the film was peeled, the stretching ratio in the direction perpendicular to the machine was 0.75 times as much as the total stretching ratio along the machine. Thus, a cellulose acetate film having 107 µm thickness is produced.

The elastic moduli of the obtained film were 430 kg/mm$^2$ along the machine (MD) and 360 kg/mm$^2$ in the direction perpendicular to the machine, and the ratio MD/TD was 1.19. The values of Rth and Re were 80 nm and 11 nm, respectively. Even after the below-described undercoating layer was formed, nothing appeared on the film surface. Thus, a highly optically anisotropic even transparent support was produced.

(Formation of Undercoating Layer)

The coating solution consisting of the following components was applied on the optically anisotropic transparent support in the amount of 28 ml/cm$^2$, and dried to form a gelatin undercoating layer of 0.1 µm thickness.

| Coating solution for gelatin undercoating layer | |
| --- | --- |
| Gelatin | 0.542 weight part |
| Formaldehyde | 0.136 weight part |
| Salicylic acid | 0.160 weight part |
| Acetone | 39.1 weight parts |
| Methanol | 15.8 weight parts |
| Methylene chloride | 40.6 weight parts |
| Water | 1.2 weight parts |

On the formed gelatin undercoating layer, the coating solution consisting of the following components was applied in the amount of 7 ml/cm$^2$, and dried to form a second undercoating layer.

| Coating solution for second undercoating layer | |
| --- | --- |
| The following anionic copolymer | 0.079 weight part |
| Citric monoethyl ester | 1.01 weight parts |
| Acetone | 20 weight parts |
| Methanol | 87.7 weight parts |
| Water | 4.05 weight parts |

(Anionic copolymer)

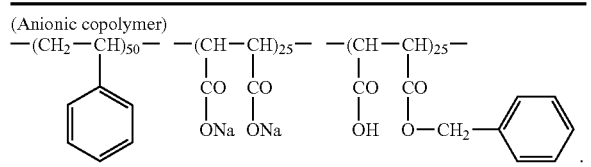

On the other side of the optically anisotropic transparent support, the coating solution consisting of the following components was applied in the amount of 25 ml/cm$^2$, and dried to form a backing layer.

| Coating solution for backing layer | |
| --- | --- |
| Cellulose diacetate (acetic acid content: 55%) | 0.656 weight part |
| Silica matting agent (mean particle size: 1 µm) | 0.065 weight part |
| Acetone | 67.9 weight parts |
| Methanol | 10.4 weight parts |

(Formation of Optically Anisotropic Layer)

On the second undercoating layer, a polyvinyl alcohol orientation layer of 0.5 µm thickness was formed. The surface of the layer was then subjected to rubbing treatment.

To prepare a coating solution, 9.1 g of the following discotic liquid crystal compound, 0.9 g of ethylene oxide denatured trimethlolpropanetriacrylate (SP327, Osaka Organic Chemicals Co., Ltd.), 0.2 g of cellulose acetate butyrate (CAB551-0.2, Eastman Chemical), 0.05 g of cellulose acetate butyrate (CAB531-1, Eastman Chemical), 3.0 g of a photo-polymerization initiator (Irgacure 907, Ciba-Geigy) and 0.1 g of a sensitizer (Kayacure DETX, Nippon Kayaku Co., Ltd.) were dissolved in 20.67 g of methyl ethyl ketone. The coating solution was then applied on the orientation layer by means of a wire bar coater of #4. The thus-treated film was fixed on a metal frame, and maintained in a thermostat at 120° C. for 3 minutes to align molecules of the discotic liquid crystal compound. While the temperature was kept at 120° C., the film was then exposed to ultraviolet rays emitted from a high pressure mercury lamp for 1 minute. The film was cooled to room temperature. Thus, an optically anisotropic layer containing the discotic liquid crystal molecules was formed.

(Discotic compound)

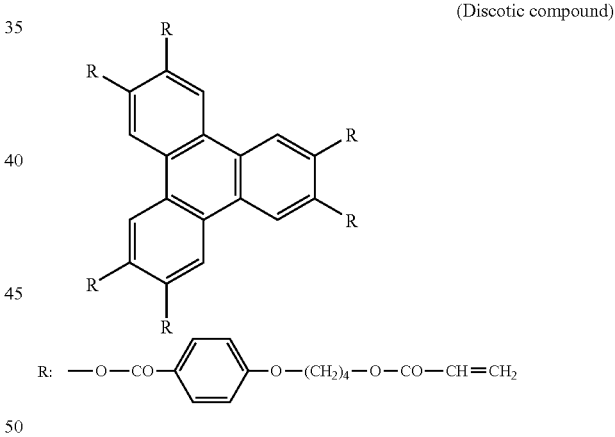

The thus-formed optically anisotropic layer had the thickness of 1.9 µm. The retardation of the layered composition of the optically anisotropic layer and the optically anisotropic transparent support (namely, optical compensatory sheet) was measured, and as a result the average inclined angle of the optical axis was found 18.2°, and the retardation values along the thickness (Rth) and in plane (Re) were found 156 nm and 33 nm, respectively.

(Preparation of Polarizing Plate having Optically Anisotropic Layer)

A stretched polyvinyl alcohol film was made to adsorb iodine, to prepare a light-absorbing polarizing element. On one side of the prepared light-absorbing polarizing element, the layered composition of the optically anisotropic layer and the optically anisotropic transparent support was laminated with an adhesive of polyvinyl alcohol type, so that the optically anisotropic layer might be outside % On the other side, the light-scattering polarizing element produced in Example 6 was laminated with the adhesive of polyvinyl alcohol type, so that the polarizing layer might be outside.

The transmission axis of the light-absorbing polarizing element was placed parallel to the slow axis of the layered composition. Further, the transmission axis of the light-absorbing polarizing element was placed parallel to the transmission axis (ne direction) of the element of light-scattering type. Thus, a polarizing plate having optically anisotropic layer was produced.

The prepared polarizing plate having optically anisotropic layer was laminated on a glass plate with an acrylic adhesive. After aged at a high temperature under a high pressure, the polarizing plate on the glass plate was left for 500 hours in a thermostat at 90° C. The polarizing plate was then observed, and thereby it was confirmed that troubles such as coming off, bubbling or wrinkling did not occur. The polarizing plate was further left for another 500 hours (1,000 hours in total) in a thermostat at 90° C. Even after such treatment, no trouble (such as coming off, bubbling or wrinkling) was observed on the polarizing plate.

EXAMPLE 12

(Production of Liquid Crystal Display)

On a glass plate having an ITO transparent electrode, an orientation layer of polyimide was provided and subjected to a rubbing treatment. This procedure was repeated to prepare two substrates, and the substrates were arranged face-to-face so that the rubbing directions might be perpendicular to each other and that the cell gap might be 5 μm with a spacer between them. Into the gap, a liquid crystal having Δn of 0.0969 (ZL4792, Merck & Co., Inc.) was introduced to prepare a liquid crystal layer.

On the backlight side of the thus-prepared liquid crystal cell of TN mode, the polarizing plate having optically anisotropic layer produced in Example 11 was laminated. On the other side, a polarizing plate having optically anisotropic layer but not having a light-scattering polarizing element was laminated. Thus, a liquid crystal display was produced. In the display, the slow axis of the layered composition of the optically anisotropic layer and the optically anisotropic support was placed perpendicularly to the rubbing direction of the liquid crystal cell.

The constitution of the display was as follows.

| | |
|---|---|
| Transparent support | (1) |
| Light-absorbing polarizing element | (2) |
| Optically anisotropic transparent support | (3) |
| Optically anisotropic layer | (4) |
| Liquid crystal cell of TN mode | (5) |
| Optically anisotropic layer | (6) |
| Optically anisotropic transparent support | (7) |
| Light-absorbing polarizing element | (8) |
| Transparent support | (9) |
| Light-scattering polarizing element | (10) |
| Backlight | (11) |

Voltage was applied to the liquid crystal cell in the liquid crystal display, to display a white image at 2V and a black image at 5V. A ratio of the transmittance (white/black) was measured as a contrast ratio. The upward-downward, and leftward-rightward viewing angles giving contrast ratios of not smaller than 10 without tone inversion were measured. As a result, the upward-downward and leftward-rightward viewing angles were found 125° and 165°, respectively. The front contrast ratio was found 230.

As compared with a liquid crystal display equipped with a conventional polarizing plate, the obtained display gave a front brightness improved by about 40%.

EXAMPLE 13

(Production of Optically Anisotropic Transparent Support)

At room temperature, 45 weight parts of cellulose acetate (average acetic acid content: 60.9%), 1.62 weight parts of the following retardation increasing agent, 232.72 weight parts of methylene chloride, 42.57 weight parts of methanol and 8.50 weight parts of n-butanol were mixed to prepare a solution (dope).

The obtained dope was cast by means of a band casting machine (effective length: 6 m), and dried to form a film (dry thickness: 100 μm).

The retardation of the formed cellulose acetate film (optically anisotropic transparent support) was measured at the wavelength of 550 nm by means of an ellipsometer (M-150, Japan Spectrum Co., Ltd.), and thereby the retardation values Re and Rth were found 5 nm and 120 nm, respectively.

(Retardation increasing agent)

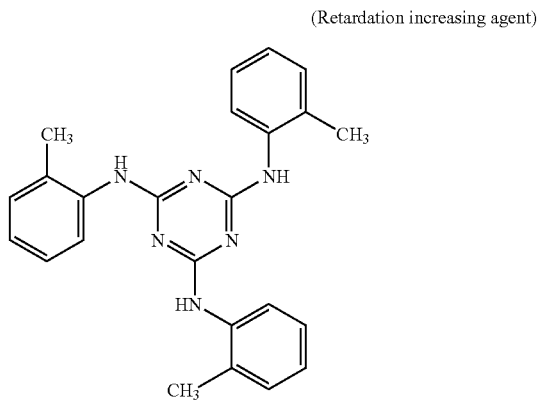

(Formation of Optically Anisotropic Layer)

An undercoating layer of gelatin was provided on the optically anisotropic transparent support.

On the gelatin undercoating layer, the coating solution consisting of the following components was applied in the amount of 28 ml/cm$^2$ by means of a wire bar coater of #16. The coated layer was dried with air at 60° C. for 60 seconds, and further dried with air at 90° C. for 150 seconds. The dried layer was then rubbed at the angle of 45° to the slow axis (measured at 632.8 nm) of the optically anisotropic transparent support.

| Coating solution for orientation layer | |
|---|---|
| The following denatured polyvinyl alcohol | 10 weight parts |
| Water | 371 weight parts |
| Methanol | 119 weight parts |
| Glutaric aldehyde (crosslinking agent) | 0.5 weight part |

-continued

Coating solution for orientation layer (Denatured polyvinyl alcohol)

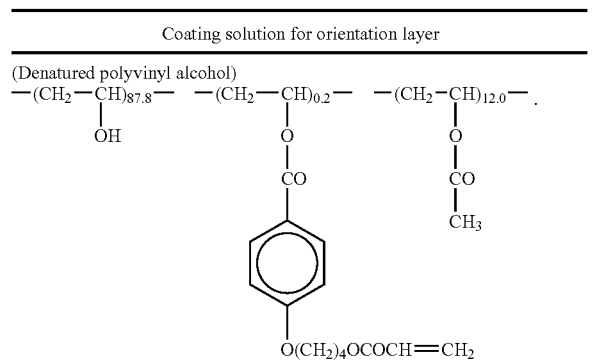

To prepare a coating solution, 41.01 g of the discotic liquid crystal compound used in Example 11, 4.06 g of ethylene oxide denatured trimethlolpropanetriacrylate (V#360, Osaka Organic Chemicals Co., Ltd.), 0.90 g of cellulose acetate butyrate (CAB-551-0.2, Eastman Chemical), 0.23 g of cellulose acetate butyrate (CAB-551-1, Eastman Chemical), 1.35 g of a photo-polymerization initiator (Irgacure 907, Ciba-Geigy) and 0.45 g of a sensitizer (Kayacure DETX, Nippon Kayaku Co., Ltd.) were dissolved in 102 g of methyl ethyl ketone. The coating solution was then applied on the orientation layer by means of a wire bar coater of #3. The thus-treated film was fixed on a metal frame, and maintained in a thermostat at 130° C. for 2 minutes to align the molecules of the discotic compound. The film was then irradiated at 130° C. for 1 minute with ultraviolet rays emitted from a high pressure mercury lamp of 120 W/cm, so as to polymerize the discotic liquid crystal molecules. The film was cooled to room temperature. Thus, an optically anisotropic layer was formed.

The Re retardation value was measured at 546 nm, and found 38 nm. The average angle (average inclined angle) between the discotic plane and the optically anisotropic transparent support was found 40°.

(Production of Elliptically Polarizing Plate)

The optically anisotropic transparent support was soaked in an alkali bath to saponify, and then laminated with an adhesive on one face of the light-absorbing polarizing element prepared from polyvinyl alcohol and iodine. Further, the layered composition of the optically anisotropic layer and the optically anisotropic transparent support was laminated with an adhesive on that of the light-absorbing polarizing element and the optically anisotropic transparent support, so that both optically anisotropic transparent supports might be contact with each other.

The transmission axis of the light-absorbing polarizing element was placed parallel to the slow axes of both optically anisotropic transparent supports.

On the other side of the light-absorbing polarizing element, the light-scattering polarizing element was laminated with an adhesive so that the transmission axis of the light-absorbing polarizing element might be parallel to that (ne direction) of the light-scattering polarizing element. Thus, an elliptically polarizing plate was produced.

(Production of Second Elliptically Polarizing Plate)

The above procedure was repeated except that an optically isotropic film of cellulose triacetate was used in place of the light-scattering polarizing element, to produce a second elliptically polarizing plate.

(Production of Liquid Crystal Cell of Bend Alignment Mode)

On a glass plate having an ITO transparent electrode, an orientation layer of polyimide was provided and subjected to a rubbing treatment. This procedure was repeated to prepare two substrates, and the substrates were arranged face-to-face so that the rubbing directions might be perpendicular to each other and that the cell gap might be 6 μm with a spacer between them. Into the gap, a liquid crystal having Δn of 0.1396 (ZLI1132, Merck & Co., Inc.) was introduced to prepare a liquid crystal cell of bend alignment mode.

(Production of Liquid Crystal Display)

The liquid crystal cell of bend alignment mode was sandwiched between the above-prepared elliptically polarizing plate and the second elliptically polarizing plate. The elliptically polarizing plate was laminated so that the light-scattering polarizing element might be on the backlight side, and the second elliptically polarizing plate was laminated so that the optically isotropic film of cellulose triacetate might be on the observer side. The optically anisotropic layer of each elliptically polarizing plate was faced to the cell substrate, and the rubbing direction of the liquid crystal cell was placed antiparallel to the rubbing direction of the facing optically anisotropic layer.

EXAMPLE 14

(Production of Transparent Support)

A gelatin undercoating layer was formed on a cellulose triacetate film of 100 μm thickness, to prepare a transparent support.

The retardation values Re and Rth were measured at 546 nm, and found 0.6 nm and 35 nm, respectively.

(Formation of Orientation Layer)

On the gelatin undercoating layer, the coating solution used in Example 13 was applied in the amount of 28 ml/cm² by means of a wire bar coater of #16. The coated layer was dried with air at 60° C. for 60 seconds, and further dried with air at 90° C. for 150 seconds. The dried layer was then rubbed at the angle of 45° to the slow axis (measured at 632.8 nm) of the transparent support.

(Formation of Optically Anisotropic Layer)

To prepare a coating solution, 41.01 g of the discotic liquid crystal compound used in Example 11, 4.06 g of ethylene oxide denatured trimethlolpropanetriacrylate (V#360, Osaka Organic Chemicals Co., Ltd.), 0.90 g of cellulose acetate butyrate (CAB-551-0.2, Eastman Chemical), 0.23 g of cellulose acetate butyrate (CAB-551-1, Eastman Chemical), 1.35 g of a photo-polymerization initiator (Irgacure 907, Ciba-Geigy) and 0.45 g of a sensitizer (Kayacure DETX, Nippon Kayaku Co., Ltd.) were dissolved in 102 g of methyl ethyl ketone. The coating solution was then applied on the orientation layer by means of a wire bar coater of #3. The thus-treated film was fixed on a metal frame, and maintained in a thermostat at 130° C. for 2 minutes to align the molecules of the discotic compound. The film was then irradiated at 130° C. for 1 nminute with ultraviolet rays emitted from a high pressure mercury lamp of 120 W/cm, so as to polymerize the discotic liquid crystal molecules. The film was cooled to room temperature. Thus, an optically anisotropic layer was formed.

The Re retardation value of the optically anisotropic layer was measured at 546 nm, and found 38 nm. The average angle (average inclined angle) between the discotic plane and the transparent support was found 40°.

(Production of Elliptically Polarizing Plate)

The transparent support was soaked in an alkali bath to saponify, and then laminated with an adhesive on one face of the light-absorbing polarizing element prepared from polyvinyl alcohol and iodine. Further, the layered composition of the optically anisotropic layer and the transparent support was laminated with an adhesive on that of the light-absorbing polarizing element and the transparent support, so that both transparent supports might be contact with each other.

The transmission axis of the light-absorbing polarizing element was placed parallel to the slow axes of both optically anisotropic transparent supports.

On the other side of the light-absorbing polarizing element, the light-scattering polarizing element was laminated with an adhesive so that the transmission axis of the light-absorbing polarizing element might be parallel to that (ne direction) of the light-scattering polarizing element. Thus, an elliptically polarizing plate was produced.

(Production of Second Elliptically Polarizing Plate)

The above procedure was repeated except that an optically isotropic film of cellulose triacetate was used in place of the light-scattering polarizing element, to produce a second elliptically polarizing plate.

(Production of Liquid Crystal Cell of Bend Alignment Mode)

On a glass plate having an ITO transparent electrode, an orientation layer of polyimide was provided and subjected to a rubbing treatment. This procedure was repeated to prepare two substrates, and the substrates were arranged face-to-face so that the rubbing directions might be antiparallel to each other and that the cell gap might be 3.7 µm with a spacer between them. Into the gap, a liquid crystal having $\Delta n$ of 0.0988 (ZLI4792, Merck & Co., Inc.) was introduced to prepare a liquid crystal cell of horizontal aligning mode.

(Production of Liquid Crystal Display)

The prepared liquid crystal cell of horizontal aligning mode was sandwiched between the above-prepared elliptically polarizing plate and the second elliptically polarizing plate. The elliptically polarizing plate was laminated so that the light-scattering polarizing element might be on the backlight side, and the second elliptically polarizing plate was laminated so that the optically isotropic film of cellulose triacetate might be on the observer side. The optically anisotropic layer of each elliptically polarizing plate was faced to the cell substrate, and the rubbing direction of the liquid crystal cell was placed anti-parallel to the rubbing direction of the facing optically anisotropic layer.

(Evaluation of Liquid Crystal Display)

The liquid crystal displays produced in Examples 13 and 14 were evaluated with respect to the viewing angle and the brightness. The results are set forth in Table 1.

TABLE 1

| Liquid crystal display | Display mode | Viewing angle (up/down/left/right) | Brightness |
|---|---|---|---|
| Ex. 13 | Bend | 80°/70°/73°/73° | 600 cd |
| Ex. 14 | Horizontal | 75°/45°/56°/55° | 450 cd |

EXAMPLE 15

(Preparation of Coating Solution for Polarizing Layer)

In 40 g of dichloromethane, 7.2 g of a commercially available rod-like liquid crystal compound (E9, Merck Japan, Inc.), 0.3 g of polyvinyl cinnamate, 2.4 g of 2-ethylhexyl acrylate and 0.1 g of a photo-polymerization initiator (Irgacure 907, Ciba-Geigy) were dissolved. The solution was then filtered through a Teflon filter (porous size: 30 µm), to prepare a coating solution for polarizing layer.

(Production of Light-Scattering Polarizing Element)

A cellulose triacetate film (TAC-TD80U, Fuji Photo Film Co., Ltd.) having 80 µm thickness was coated with the coating solution for polarizing layer by means of a bar coater, dried at 120° C., and exposed to linearly polarized ultraviolet light (illuminance: 30 mW/cm$^2$, exposure: 400 mJ/cm$^2$) emitted from a polarized ultraviolet light irradiation machine (Nikon Gijutsu-kobo co., Ltd.) to harden the coating layer. Thus, a polarizing layer of 15 µm thickness was formed to produce a light-scattering polarizing element.

(Production of Polarizing Plate)

The above-produced light-scattering polarizing element and a commercially available light-absorbing polarizing element were laminated with an adhesive, to produce a polarizing plate.

EXAMPLE 16

(Preparation of Coating Solution for Polarizing Layer)

In 15.0 g of ethyl acetate, 4.5 g of a rod-like liquid crystal compound (N26), 0.3 g of a mixture of dipentaerythritolpentaacrylate and dipentaerythritolhexaacrylate (DPHA, Nippon Kayaku Co., Ltd.), 0.1 g of a photo-orienting polymer (PA-1, photo-isomerizing polymer) and 0.1 g of a photo-polymerization initiator (Irgacure 907, Ciba-Geigy) were dissolved. The solution was then filtered through a Teflon filter (porous size: 30 µm), to prepare an optically anisotropic phase.

Independently, 10 g of gelatin (681, Nitta Gelain Co., Ltd.) was dissolved in 90 g of water. To the solution, 0.2 g of sodium docylbenzenesulfonate (surface active agent) was added and dissolved. The obtained solution was then filtered through a Teflon filter (porous size: 30 µm), to prepare an optically isotropic phase.

A mixture of 10 g of the optically anisotropic phase and 10 g of the optically isotropic phase was heated at 60° C., and dispersed by means of an ultrasonic disperser, to prepare a coating solution for polarizing layer.

(Production of Light-Scattering Polarizing Element)

On a cellulose triacetate film (Fuji Photo Film Co., Ltd.) of 100 µm thickness having a gelatin undercoating layer, the above-prepared coating solution was applied according to the curtain-coating method. After gelatin was set at 10° C., the applied solution was dried at 25° C. The formed layer was then exposed at the incident angle of 45° to ultraviolet light (illuminance: 200 mW/cm$^2$, exposure: 400 mJ/cm$^2$), which had been emitted from a 160 W/cm air-cooled metal halide lamp (Eyegraphics Co., Ltd.; wavelength region: 200 to 500 nm, maximum wavelength: 365 nm) and made to be parallel rays by collimator. Thereby, the layer was hardened to form a polarizing layer of 30 µm thickness. Thus, a light-scattering polarizing element was produced.

(Production of Polarizing Plate)

The above-produced light-scattering polarizing element and a commercially available light-absorbing polarizing element were laminated with an adhesive, to produce a polarizing plate.

EXAMPLE 17

(Preparation of Coating Solution for Polarizing Layer)

In 15.0 g of ethyl acetate, 4.6 g of a photo-orienting polymer (PA-5, photo-dimerizing polymer), 0.3 g of a mixture of dipentaerythritolpentaacrylate and dipentaerythritolhexaacrylate (DPHA, Nippon Kayaku Co., Ltd.) and 0.1 g of a photo-polymerization initiator (Irgacure 907, Ciba-Geigy) were dissolved. The solution was then filtered through a Teflon filter (porous size: 30 μm), to prepare an optically anisotropic phase.

A mixture of 10 g of the optically anisotropic phase and 10 g of the optically isotropic phase prepared in Example 16 was heated at 60° C., and dispersed by means of an untrasonic disperser, to prepare a coating solution for polarizing layer.

(Production of Light-Scattering Polarizing Element)

On a cellulose triacetate film (Fuji Photo Film Co., Ltd.) of 80 μm thickness, the above-prepared coating solution was applied according to the curtain-coating method. After gelatin was set at 10° C., the applied solution was dried at 25° C. The formed layer was then exposed to linearly polarized ultraviolet light (illuminance: 30 mW/cm$^2$, exposure: 400 mJ/cm$^2$) emitted from a polarized ultraviolet light irradiation machine (Nikon Gijutsu-kobo co., Ltd.) to harden the coating layer. Thus, a polarizing layer of 30 μm thickness was formed to produce a light-scattering polarizing element (Production of Polarizing Plate)

The above-produced light-scattering polarizing element and a commercially available light-absorbing polarizing element were laminated with an adhesive, to produce a polarizing plate.

COMPARISON EXAMPLE 1

(Preparation of Coating Solution for Polarizing Layer)

In 40 g of dichloromethane, 7.5 g of a commercially available rod-like liquid crystal compound (E9, Merck Japan, Inc.), 2.4 g of 2-ethylhexyl acrylate and 0.1 g of a photopolymerization initiator (Irgacure 907, Ciba-Geigy) were dissolved. The solution was then filtered through a Teflon filter (porous size: 30 μm), to prepare a coating solution for polarizing layer.

(Production of Light-Scattering Polarizing Element)

A cellulose triacetate film (TAC-TD80U, Fuji Photo Film Co., Ltd.) having 80 μm thickness was coated with the coating solution for polarizing layer by means of a bar coater, dried at 120° C., and exposed to linearly polarized ultraviolet light (illuminance: 30 mW/cm$^2$, exposure: 400 mJ/cm$^2$) emitted from a polarized ultraviolet light irradiation machine (Nikon Gijutsu-kobo co., Ltd.) to harden the coating layer. Thus, a polarizing layer of 15 μm thickness was formed to produce a light-scattering polarizing element.

(Production of Polarizing Plate)

The above-produced light-scattering polarizing element and a commercially available light-absorbing polarizing element were laminated with an adhesive, to produce a polarizing plate.

COMPARISON EXAMPLE 2

The procedure of Example 15 was repeated except that light was not applied, so as to produce a light-scattering polarizing element and a polarizing plate.

(Evaluation of Light-Scattering Polarizing Element)

1. Refractive Index

The refractive indexes of optically anisotropic phase and optically isotropic phase were measured by means of an Abbe's refractometer. For measuring the refractive index of optically anisotropic phase, a liquid mixture of the optically anisotropic compound and the photo-orienting polymer was applied on a high refractive glass plate and exposed to linearly polarized light to align the liquid crystal molecules. The formed film was then measured to obtain the refractive index of optically anisotropic phase. On the other hand, for measuring the refractive index of optically isotropic phase, the isotropic polymer neat or, if needed, containing additives was applied on a high refractive glass plate, and measured to obtain the refractive index of optically isotropic phase.

The results are set forth in Table 2.

TABLE 2

| Light scattering polarizing element | Optically anisotropic compound | | Optically isotropic compound |
|---|---|---|---|
| | n1 | n2 | n3 |
| Example 15 | 1.78 | 1.53 | 1.53 |
| Example 16 | 1.66 | 1.53 | 1.53 |
| Example 17 | 1.64 | 1.53 | 1.53 |
| Comp. Ex. 1 | 1.78 | 1.53 | 1.53 |
| Comp. Ex. 2 | 1.78 | 1.53 | 1.53 |

2. Transmittance and Scattering Degree (Haze)

The transmittance and the haze of each prepared light-scattering polarizing element were measured with a haze mater (MODEL 1001DP, Nippon Denshoku Kogyo Co., Ltd.). In the measurement, a polarizer was inserted between the light source and the element. The measurement was carried out with the transparent axis of the polarizer placed parallel or perpendicular to that of the polarizing layer. The measured values when the axes are parallel are shown as values in parallel, and those when the axes are perpendicularly placed are shown as values in perpendicular. The transmittance was evaluated in terms of that for all rays, and the scattering degree was evaluated in terms of haze value. If the element has polarizability, the transmittance in parallel is higher than that in perpendicular while the haze in parallel is lower than that in perpendicular.

The results are set forth in Table 3.

3. Surface Condition

The element of light-scattering type was inserted between two polarizers, and the surface condition of the element was observed while rotated between the polarizers. The results are set forth in Table 3.

TABLE 3

| Light scattering polarizing element | Transmittance for all rays (%) | | Haze (%) | | Surface condition |
|---|---|---|---|---|---|
| | Parallel | Perpendicular | Parallel | Perpendicular | |
| Example 15 | 85.3 | 46.2 | 5.3 | 82.3 | Uniform |
| Example 16 | 80.2 | 55.7 | 10.2 | 63.8 | Uniform |
| Example 17 | 82.9 | 51.0 | 8.8 | 79.4 | Uniform |
| Comp. Ex. 1 | 59.2 | 61.4 | 28.2 | 28.6 | No anisotropy |
| Comp. Ex. 2 | 67.4 | 66.3 | 31.8 | 33.3 | No anisotropy |

(Remarks)

No anisotropy: No anisotropy was observed in scattering.

The polarizing elements of light-scattering type produced in Examples 15 to 17 exhibited high polarizability. Each of them had a transmittance of 80% or more in parallel arrangement while the transmittance in perpendicular arrangement was 20% or less. Since no color was observed through each element of Examples 15 to 17 in perpendicular arrangement, all the light not passing through the element was presumed to scatter backward. It can be, therefore, expected that those films can remarkably improve the light efficiency of liquid crystal display.

The element of Example 16 showed small polarizablity, as compared with $\Delta n$ of the used optical anisotropic compound. The reason of that is because the optical anisotropy was not fully developed by exposure to light, and hence it indicates that exposure to linearly polarized light is preferred.

The elements of Comparison Examples 1 and 2 did not exhibit polarizability. Because the element of Comparison Example 1 contained no photo-orienting compound and because exposure to light was not performed in Comparison Example 2, molecules of the photo-orienting compound were presumed not to align in the comparison elements. In fact, they were observed through a polarizing microscope (×400), to found random orientation in small domains.

EXAMPLE 18

(Confirmation of Improvement of Light Efficiency)

The polarizing plate produced in Example 17 was placed on a reflection board of aluminum so that the polarizing layer might be on the reflection board side, and observed. As a result, the area covered with the light-scattering polarizing element was seen brighter. This indicates that the element improved light efficiency. The reflection board reflected incident light having passed through the polarizing plate, and only a part of the reflected light (light component parallel to the transmission axis of the polarizing layer) passed through the polarizing layer. The other component was scattered backward, reflected again by the reflection board, and reentered the polarizing layer to improve the efficiency of light.

EXAMPLE 19

The polarizing plate of Example 17 was used to produce a liquid crystal display having the constitution shown in FIG. 4.

COMPARISON EXAMPLE 3

A commercially available brightness-increasing film (DBEF, 3M) having a polarizing layer of optical interference was used to produce a liquid crystal display having the constitution shown in FIG. 4.

(Evaluation of Liquid Crystal Display)

The liquid crystal display of Example 19 equipped with a light-scattering polarizing element was observed from the position right in front of the display, and the display was also seen obliquely. As a result, brightness was clearly improved in both observations. On the other hand, the liquid crystal display of Comparison Example 3 was also observed in the same manner. As a result, brightness was improved in the front observation, but not in the oblique observation.

EXAMPLE 20

(Preparation of Coating Solution for Polarizing Layer)

In 500 g of 20 wt. % methyl ethyl ketone solution of polymethyl methacrylate, 400 g of 4'-pentyl-4-biphenylcarbonitrile was mixed. The mixture was then filtered through a Teflon filter (porous size: 30 μm), to prepare a coating solution for polarizing layer.

(Production of Light-Scattering Polarizing Element)

The coating solution for polarizing layer was cast onto a band from a die, and dried to form a film of 40 μm thickness. The film was peeled from the band, stretched by 1.1 times under dry condition at 25° C., and laminated on a saponified cellulose triacetate film of 80 μm thickness (Fuji Photo Film Co., Ltd.) with the adhesive of 5 wt. % polyvinyl alcohol (PVA117, Kuraray Ltd.) aqueous solution. The obtained layered film was dried at 120° C. to produce a light-scattering polarizing element.

(Production of Polarizing Plate)

From a commercially available polarizing plate of iodine type, the protective film was peeled. In place of the protective film, the light-scattering polarizing element was laminated so that the saponified cellulose triacetate film might be in contact with the polarizing layer containing iodine. Thus, a polarizing plate was produced.

EXAMPLE 21

(Preparation of Coating Solution for Polarizing Layer)

In 1,500 g of 20 wt. % aqueous solution of polyvinyl alcohol (PVA117, Kuraray Ltd.), 100 g of 4'-pentyl-4-biphenylcarbonitrile was mixed. The mixture was then dispersed by means of an ultrasonic disperser to prepare a coating solution for polarizing layer.

(Production of Light-Scattering Polarizing Element)

The coating solution for polarizing layer was cast onto a band from a die, and dried. When the water content was 10%, the film was peeled from the band, and laminated on a saponified cellulose triacetate film of 80 μm thickness (Fuji Photo Film Co., Ltd.). The obtained layered film was dried at 120° C. to produce a light-scattering polarizing element.

(Production of Polarizing Plate)

From a commercially available polarizing plate of iodine type, the protective film was peeled. In place of the protective film, the light-scattering polarizing element was laminated so that the saponified cellulose triacetate film might be in contact with the polarizing layer containing iodine. Thus, a polarizing plate was produced.

EXAMPLE 22

(Production of Light-Scattering Polarizing Element)

The coating solution for polarizing layer prepared in Example 21 was cast onto a band from a die, and dried to form a film of 40 μm thickness. The film was peeled from the band, stretched by 1.1 times under dry condition at 25° C., and laminated on a saponified cellulose triacetate film of 80 μm thickness (Fuji Photo Film Co., Ltd.) with the adhesive of 5 wt. % polyvinyl alcohol (PVA117, Kuraray Ltd.) aqueous solution. The obtained layered film was dried at 120° C. to produce a light-scattering polarizing element.

(Production of Polarizing Plate)

From a commercially available polarizing plate of iodine type, the protective film was peeled. In place of the protective film, the light-scattering polarizing element was laminated so that the saponified cellulose triacetate film might be in contact with the polarizing layer containing iodine. Thus, a polarizing plate was produced.

EXAMPLE 23

(Preparation of Coating Solution for Polarizing Layer)

In 150 g of ethyl acetate, 48 g of a rod-like liquid crystal compound (N26), 1.0 g of a mixture of dipentaerythritolpentaacrylate and dipentaerythritolhexaacrylate (DPHA, Nippon Kayaku Co., Ltd.) and 1.0 g of a photopolymerization initiator (Irgacure 907, Ciba-Geigy) were dissolved. The solution was then filtered through a polypropylene filter (porous size: 30 μm), to prepare an optically anisotropic phase. Independently, in 2,000 g of 20 wt. % aqueous solution of polyvinyl alcohol (PVA205, Kuraray Ltd.), 4.0 g of sodium docylbenzenesulfonate (surface active agent) was added and dissolved. The obtained solution was then filtered through a polypropylene filter (porous size: 30 μm), to prepare an optically isotropic phase.

A mixture of 200 g of the optically anisotropic phase and 200 g of the optically isotropic phase was dispersed by means of an ultrasonic disperser, to prepare a coating solution for polarizing layer.

(Production of Light-Scattering Polarizing Element)

On a polyethylene terephthalate film of 6 μm thickness, the above-prepared coating solution was applied and dried to prepare a polarizing layer of 30 μm thickness. The support and the theron-provided polarizing layer were stretched by 1.25 times under dry condition at 115° C., ripened at 90° C. for 2 minutes, and then exposed to ultraviolet light (illuminance: 200 mW/cm$^2$, exposure: 400 mJ/cm$^2$), which had been emitted from a 160 W/cm air-cooled metal halide lamp (Eyegraphics Co., Ltd.; wavelength region: 200 to 500 nm, maximum wavelength: 365 nm), to hardened the optically anisotropic phase to produce a light-scattering polarizing element.

(Production of Polarizing Plate)

From a commercially available polarizing plate of iodine type, the protective film was peeled. In place of the protective film, the light-scattering polarizing element was laminated so that the saponified cellulose triacetate film might be in contact with the polarizing layer containing iodine. Thus, a polarizing plate was produced.

EXAMPLE 24

(Preparation of Coating Solution for Polarizing Layer)

In 1,500 g of the optically isotropic phase prepared in Example 23, 100 g of 4'-pentyl-4-biphenylcarbonitrile was mixed. The mixture was then dispersed by means of an ultrasonic disperser, to prepare a coating solution for polarizing layer.

(Production of Light-Scattering Polarizing Element)

The coating solution for polarizing layer was cast onto a band from a die, and dried to form a film of 40 μm thickness. The film was peeled from the band, stretched by 1.1 times under dry condition at 25° C., and laminated on a cellulose triacetate film of 100 μm thickness (Fuji Photo Film Co., Ltd.) having a gelatin undercoating layer with the adhesive of 5 wt. % polyvinyl alcohol (PVA117, Kuraray Ltd.) aqueous solution. The obtained layered film was dried at 120° C. to produce a light-scattering polarizing element.

(Production of Polarizing Plate)

From a commercially available polarizing plate of iodine type, the protective film was peeled. In place of the protective film, the light-scattering polarizing element was laminated so that the saponified cellulose triacetate film might be in contact with the polarizing layer containing iodine. Thus, a polarizing plate was produced.

EXAMPLE 25

(Preparation of Coating Solution for Polarizing Layer)

In 1,600 g of water, 100 g of polyvinyl alcohol (PVA205, Kuraray Ltd.), 300 g of alkyl-denatured polyvinyl alcohol (MP203, Kuraray Ltd.), 0.2 g of of sodium docylbenzenesulfonate (surface active agent) and 2.0 g of glycerol (plasticizer) were dissolved to prepare an optically isotropic phase.

To 1,500 g of the optically isotropic phase, 100 g of 4'-pentyl-4-biphenylcarbonitrile and 4 g of glutaric aldehyde was mixed. The mixture was then dispersed by means of an ultrasonic disperser, to prepare a coating solution for polarizing layer.

(Production of Light-Scattering Polarizing Element)

The coating solution for polarizing layer was cast onto a band from a die, and dried to form a film of 100 μm thickness. The film was peeled from the band, stretched by 1.2 times under dry condition at 25° C., and laminated on a cellulose triacetate film of 80 μm thickness (Fuji Photo Film Co., Ltd.) with the adhesive of 5 wt. % polyvinyl alcohol (PVA117, Kuraray Ltd.) aqueous solution. The obtained layered film was dried at 120° C. to produce a light-scattering polarizing element.

(Production of Polarizing Plate)

From a commercially available polarizing plate of iodine type, the protective film was peeled. In place of the protective film, the light-scattering polarizing element was laminated so that the saponified cellulose triacetate film might be in contact with the polarizing layer containing iodine. Thus, a polarizing plate was produced.

EXAMPLE 26

(Production of Light-Scattering Polarizing Element)

The coating solution for polarizing layer prepared in Example 25 was cast onto a band from a die, and dried to form a film of 40 μm thickness. The film was peeled from the band, stretched by 1.1 times under dry condition at 25° C., immersed in 100 g/l boric acid aqueous solution at 70° C. for 5 minutes, washed in water at 20° C. for 10 seconds, dried at 80° C. for 5 minutes, and laminated on a saponified cellulose triacetate film (Fuji Photo Film Co., Ltd.) with the adhesive of 5 wt. % polyvinyl alcohol (PVA117, Kuraray Ltd.) aqueous solution. The obtained layered film was dried at 120° C. to produce a light-scattering polarizing element.

(Production of Polarizing Plate)

From a commercially available polarizing plate of iodine type, the protective film was peeled. In place of the protective film, the light-scattering polarizing element was laminated so that the saponified cellulose triacetate film might be in contact with the polarizing layer containing iodine. Thus, a polarizing plate was produced.

COMPARISON EXAMPLE 4

(Preparation of Coating Solution for Polarizing Layer)

In 2,000 g of 5 wt. % methylene chloride solution of polycarbonate, 400 g of 4'-pentyl-4-biphenylcarbonitrile was mixed. The mixture was then filtered through a Teflon filter (porous size: 30 μm), to prepare a coating solution for polarizing layer.

(Production of Light-Scattering Polarizing Element)

The coating solution for polarizing layer was cast onto a band from a die, and dried to form a film of 40 μm thickness. The film was peeled from the band, stretched by 1.1 times under dry condition at 25° C., and laminated on a cellulose triacetate film of 80 μm thickness (Fuji Photo Film Co., Ltd.) with a commercially available adhesive. The obtained layered film was dried at 120° C. to produce a light-scattering polarizing element.

(Production of Polarizing Plate)

From a commercially available polarizing plate of iodine type, the protective film was peeled. In place of the protective film, the light-scattering polarizing element was laminated so that the saponified cellulose triacetate film might be in contact with the polarizing layer containing iodine. Thus, a polarizing plate was produced.

COMPARISON EXAMPLE 5

(Preparation of Coating Solution for Polarizing Layer)

In 1,500 g of 20 wt. % aqueous solution of polyvinyl alcohol (PVA205, Kuraray Ltd.), 100 g of biphenyl was mixed. The mixture was then dispersed at 70° C. by means of an ultrasonic disperser, to prepare a coating solution for polarizing layer.

(Production of Light-Scattering Polarizing Element)

The coating solution for polarizing layer was cast onto a band from a die, and dried to form a film of 40 μm thickness. The film was peeled from the band, stretched by 1.1 times under dry condition at 25° C., and laminated on a saponified cellulose triacetate film of 80 μm thickness (Fuji Photo Film Co., Ltd.) with the adhesive of 5 wt. % polyvinyl alcohol (PVA117, Kuraray Ltd.) aqueous solution. The obtained layered film was dried at 120° C. to produce a light-scattering polarizing element.

(Production of Polarizing Plate)

From a commercially available polarizing plate of iodine type, the protective film was peeled. In place of the protective film, the light-scattering polarizing element was laminated so that the saponified cellulose triacetate film might be in contact with the polarizing layer containing iodine. Thus, a polarizing plate was produced.

COMPARISON EXAMPLE 6

The procedure of Example 23 was repeated except that the film was not stretched, to produce a light-scattering polarizing element.

(Production of Polarizing Plate)

From a commercially available polarizing plate of iodine type, the protective film was peeled. In place of the protective film, the light-scattering polarizing element was laminated so that the saponified cellulose triacetate film might be in contact with the polarizing layer containing iodine. Thus, a polarizing plate was produced.

(Evaluation of Light-Scattering Polarizing Element)

1. Birefringence

The birefringence of the continuous phase was measured. The film having no discontinuous phase was stretched by a constant extension ratio, and then the refractive indexes along MD and TD were measured by means of an Abbe's refractometer.

2. Transmittance and Scattering Degree (Haze)

The transmittance and the haze of each prepared light-scattering polarizing element were measured with a haze mater (MODEL 1001DP, Nippon Denshoku Kogyo Co., Ltd.). In the measurement, a polarizer was inserted between the light source and the element. The measurement was carried out with the transparent axis of the polarizer placed parallel or perpendicular to that of the polarizing layer. The measured values when the axes are parallel are shown as values in parallel, and those when the axes are perpendicularly placed are shown as values in perpendicular. The transmittance was evaluated in terms of that for all rays, and the scattering degree was evaluated in terms of haze value. If the element has polarizability, the transmittance in parallel is higher than that in perpendicular while the haze in parallel is lower than that in perpendicular.

3. Particle Size of Discontinuous Phase

The light-scattering polarizing element was cut with a microtome, and the section was observed by a scanning electron microscope (×5,000) to take a micrograph. From the micrograph, 100 particles of the discontinuous phase were randomly selected and the mean radius of the approximated circles was measured.

The results were set forth in Table 4. The polarizing elements of light-scattering type produced in Examples 20 to 26 exhibited high polarizability. Each of them had a transmittance of 60% or less in parallel arrangement while the transmittance in perpendicular arrangement was 75% or more.

The elements of Examples 20 and 23 showed relatively small polarizablity. The reason of that is because their discontinuous phases had large sizes. The smaller the mean particle size of discontinuous phase is, the more the liquid crystal molecules align. Besides that, the liquid crystal compound used in Example 23 had such small birefringence that the element showed small polarizability.

Although the stretching was not performed in Example 21, the element of Example 21 showed polarizability. It was presumed that the reason of that is because the liquid crystal molecules were aligned by stress applied in peeling.

The elements of Examples 22, 23, 25 and 26 were left for 3 days under the condition of high temperature (40° C.) and high humidity (relative humidity: 80%). After that treatment, the elements of Examples 22 and 25 were remarkably curled and showed no polarizability. On the other hand, however, even after that, there was no change in polarizability of the element of Examples 23. It was presumed that the reason of that is because the alignment of liquid crystal molecules was fixed by polymerization of the molecules in Example 23. The above treatment only slightly impaired the polarizability of the element of Example 26. The continuous phase in the element of Example 26 was so reinforced by crosslinking that it was hardly affected by humidity.

The elements of Comparison Examples 4 to 6 showed little polarizability. In the element of Comparison Example 4, the continuous phase gave such large refringence and had such a large refractive index in the stretched direction that the difference between the refractive index of continuous phase and that of discontinuous phase, namely the optical anisotropy, was small. In Comparison Example 5, a liquid crystal compound was not used in the discontinuous phase, and hence the molecules were little aligned. The stretching was not performed in Comparison Example 6, and hence the liquid crystal molecules in the discontinuous phase were not aligned.

TABLE 4

| Light scattering polarizing element | Bire-frin-gence | Transmittance for all rays (%) | | Haze (%) | | Size of discon-tinuous phase |
|---|---|---|---|---|---|---|
| | | Par-allel | Perpen-dicular | Par-allel | Perpen-dicular | |
| Example 20 | <0.01 | 56.7 | 78.6 | 78.1 | 34.8 | 2.1 μm |
| Example 21 | <0.01 | 52.5 | 88.8 | 85.5 | 19.0 | 0.3 μm |
| Example 22 | <0.01 | 51.4 | 90.7 | 85.2 | 15.0 | 0.3 μm |
| Example 23 | <0.01 | 58.4 | 80.1 | 74.3 | 27.4 | 1.5 μm |
| Example 24 | <0.01 | 50.5 | 89.6 | 83.1 | 18.8 | 0.3 μm |
| Example 25 | <0.01 | 49.2 | 90.1 | 84.1 | 13.5 | 0.3 μm |
| Example 26 | <0.01 | 48.7 | 90.0 | 83.0 | 13.8 | 0.3 μm |
| Comp. Ex. 4 | 0.11 | 72.3 | 75.2 | 39.1 | 42.3 | 2.5 μm |
| Comp. Ex. 5 | <0.01 | 82.7 | 89.3 | 24.3 | 7.8 | 0.6 μm |
| Comp. Ex. 6 | <0.01 | 78.1 | 80.4 | 36.3 | 31.9 | 1.5 μm |

EXAMPLE 27

(Production of Light-Scattering Polarizing Element)

The coating solution for polarizing layer prepared in Example 25 was cast onto a band from a die, and dried to form a film of 40 μm thickness. The film was peeled from the band, stretched by 1.2 times under dry condition at 25° C., and pressed and laminated without adhesive onto an iodine-adsorbing polyvinyl alcohol film having been stretched by 6 times. The obtained layered film was then immersed in 100 g/l boric acid aqueous solution at 70° C. for 5 minutes, washed in water at 20° C. for 10 seconds, and dried at 80° C. for 5 minutes. On each of the top and bottom surfaces of the film, a saponified cellulose triacetate film (Fuji Photo Film Co., Ltd.) was laminated with the adhesive of 5 wt. % polyvinyl alcohol (PVA117, Kuraray Ltd.) aqueous solution. The obtained layered film was dried at 120° C. to produce a polarizing plate.

(Evaluation of Polarizing Plate)

The polarizing plates produced in Examples 26 and 26 and a commericially available polarizing plate (consisting of a light-absorbing polarizing element alone) were placed on a reflection board of aluminum so that the polarizing layer of each plate might be on the reflection board side, and observed. As a result, the areas covered with the polarizing plates of Examples 26 and 27 were seen brighter. This indicates that those plates improved light efficiency. The reflection board reflected incident light having passed through each polarizing plate, and only a part of the reflected light (light component parallel to the transmission axis of the polarizing layer) passed through the polarizing layer. The other component was scattered backward, reflected again by the reflection board, and reentered the polarizing layer to improve the efficiency of light.

The plates of Examples 26 and 27 were left for 3 days under the condition of high temperature (40° C.) and high humidity (relative humidity: 80%). That treatment impaired the increase of brightness of the plate of Examples 26. On the other hand, however, even after that, there was no change in brightness of the plate of Examples 27.

EXAMPLE 28

(Production of Liquid Crystal Display)

The polarizing plate of Example 25 was used to produce a liquid crystal display having the constitution shown in FIG. 3.

EXAMPLE 29

(Production of Liquid Crystal Display)

The polarizing plate of Example 27 was used to produce a liquid crystal display having the constitution shown in FIG. 4.

(Evaluation of Liquid Crystal Display)

The liquid crystal display of Examples 28 and 29 were observed from the position right in front of the display, and the display was also seen obliquely. As a result, brightness of each plate was improved both in the front observation and in the oblique observation.

What is claimed is:

1. A process for preparation of a polarizing plate comprising a light-scattering polarizing element having a polarizing layer which selectively transmits polarized light and selectively reflects or scatters other polarized light, and a light-absorbing polarizing element having a polarizing layer which selectively transmits polarized light and selectively absorbs polarized light, said elements being so arranged that the polarizing transmission axis of the light-scattering polarizing element is essentially parallel to the polarizing transmission axis of the light-absorbing polarizing element, and said polarizing layer in the light-scattering polarizing element comprising an optically isotropic continuous phase and an optically anisotropic discontinuous phase, and wherein the process comprises irradiating a discontinuous phase containing a compound having a light-orienting group with light to form the optically anisotropic discontinuous phase.

2. The process as defined in claim 1, wherein the plate further comprises at least one transparent support.

3. The process as defined in claim 2, wherein the transparent support comprises a cellulose triacetate film.

4. The process as defined in claim 3, wherein the process further comprises forming the cellulose triacetate film essentially without use of a halogenated hydrocarbon as a solvent.

5. The process as defined in claim 1, wherein the minimum difference between the refractive index of the optically isotropic continuous phase and the refractive index of the optically anisotropic discontinuous phase is less than 0.05 where the refractive indices are measured along directions in plane of the polarizing layer.

6. The process as defined in claim 1, wherein the optically isotropic continuous phase contains a polymer.

7. The process as defined in claim 1, wherein the optically anisotropic discontinuous phase has a mean particle size of 0.01 to 10 μm.

8. The process as defined in claim 1, wherein the optically anisotropic discontinuous phase contains a liquid crystal compound.

9. The process as defined in claim 1, wherein the optically anisotropic discontinuous phase contains a polymerization product of a liquid crystal compound having a polymerizable group.

10. The process as defined in claim 1, wherein the maximum transmittances for all rays is not less than 75% and the minimum transmittances for all rays is less than 60% where the transmittances are measured along polarizing planes perpendicular to plane of the polarizing layer in the light-scattering polarizing element.

11. The process as defined in claim 1, wherein the light-absorbing polarizing element has a polarization degree of not lower than 99%.

12. The process as defined in claim 1, wherein the polarizing plate further comprises an optical anisotropic layer containing a discotic compound, and the optical anisotropic layer, the light absorbing polarizing element and the light-scattering polarizing element are arranged in this order.

13. The process as defined in claim 1, wherein light used in the light irradiation is linearly polarized light.

14. The process as defined in claim 1, wherein light used in the light irradiation is applied to the phase in one direction.

15. The process as defined in claim 1, wherein light used in the light irradiation has a wavelength in the region of 190 to 320 nm.

16. The process as defined in claim 1, wherein the compound having a light-orienting group is a photo-dimerizing polymer, a photo-decomposition polymer or a photo-isomerizing polymer.

17. A process for preparation of a liquid crystal display comprising a backlight, a polarizing plate, a liquid crystal cell of bend alignment mode and another polarizing plate in this order, wherein the polarizing plate on the backlight comprises a light-scattering polarizing element having a polarizing layer which selectively transmits polarized light and selectively reflects or scatters other polarized light, and a light-absorbing polarizing element having a polarizing layer which selectively transmits polarized light and selectively absorbs polarized light, said elements being so arranged that the polarizing transmission axis of the light-scattering polarizing element is essentially parallel to the polarizing transmission axis of the light-absorbing polarizing element, and said polarizing layer in the light-scattering polarizing element comprising an optically isotropic continuous phase and an optically anisotropic discontinuous phase, and wherein the process comprises irradiating a discontinuous phase containing a compound having a light-orienting group with light to form the optically anisotropic discontinuous phase.

18. The process as defined in claim 17, wherein the polarizing plate on the backlight further comprises a transparent support and an optical anisotropic layer containing a discotic compound, and wherein the backlight, the light-scattering polarizing element, the light-absorbing polarizing element, the transparent support and the optical anisotropic layer are arranged in this order.

19. A process for preparation of an optical film comprising a transparent support and a polarizing layer which selectively transmits polarized light and selectively reflects or scatters other polarized light, said polarizing layer comprising an optically isotropic continuous phase and an optically anisotropic discontinuous phase, wherein the process comprises irradiating a discontinuous phase containing a compound having a light-orienting group with light to form the optically anisotropic discontinuous phase, wherein the maximum transmittances for all rays is not less than 75% and the minimum transmittances for all rays is less than 60% where the transmittances are measured along polarizing planes perpendicular to plane of the polarizing layer.

20. The process as defined in claim 19, wherein the minimum difference between the refractive index of the optically isotropic continuous phase and the refractive index of the optically anisotropic discontinuous phase is less then 0.05 where the refractive indices are measured along directions in plane of the film.

21. The process as defined in claim 19, wherein the optically anisotropic discontinuous phase contains a liquid crystal compound.

22. The process as defined in claim 21, wherein the liquid crystal compound has a characteristic birefringence of not less than 0.10.

23. The process as defined in claim 19, wherein the optically anisotropic discontinuous phase contains a polymerization product of a liquid crystal compound having a polymerizable group.

24. The process as defined in claim 19, wherein the optically anisotropic discontinuous phase has a mean particle size of not larger than 1.0 μm.

25. The process as defined in claim 19, wherein the polarizing layer is formed by stretching the layer at a stretching ratio of not more than 3.0.

* * * * *